(12) United States Patent
Putz de la Fuente

(10) Patent No.: US 11,565,198 B2
(45) Date of Patent: Jan. 31, 2023

(54) HYDROCYCLONE VIBRATION MONITORING SYSTEM AND METHOD

(71) Applicant: Vulco S.A., Santiago (CL)

(72) Inventor: Eduardo Putz de la Fuente, Santiago (CL)

(73) Assignee: VULCO S.A.

( * ) Notice: Subject to any disclaimer, the term of this patent is extended or adjusted under 35 U.S.C. 154(b) by 0 days.

(21) Appl. No.: 16/981,043

(22) PCT Filed: Mar. 14, 2019

(86) PCT No.: PCT/AU2019/050228
§ 371 (c)(1),
(2) Date: Sep. 15, 2020

(87) PCT Pub. No.: WO2019/173874
PCT Pub. Date: Sep. 19, 2019

(65) Prior Publication Data
US 2021/0106930 A1 Apr. 15, 2021

Related U.S. Application Data

(60) Provisional application No. 62/643,659, filed on Mar. 15, 2018.

(51) Int. Cl.
*B01D 21/34* (2006.01)
*B04C 5/28* (2006.01)
(Continued)

(52) U.S. Cl.
CPC .......... *B01D 21/34* (2013.01); *B01D 21/267* (2013.01); *B04C 5/28* (2013.01); *G01H 1/14* (2013.01);
(Continued)

(58) Field of Classification Search
CPC ...... B01D 21/26; B01D 21/267; B01D 21/30; B01D 21/34; B04C 11/00; B04C 5/28;
(Continued)

(56) References Cited

U.S. PATENT DOCUMENTS

| 7,484,416 | B1* | 2/2009 | Klosinski | G05B 23/0235 714/25 |
| 2005/0016903 | A1* | 1/2005 | Olson | B04C 11/00 209/590 |

(Continued)

FOREIGN PATENT DOCUMENTS

| CN | 101821690 A | 9/2010 |
| CN | 102947006 A | 2/2013 |

(Continued)

OTHER PUBLICATIONS

Spencer et al, Statistical Signal Processing Methods for Acoustic Emission Monitoring of Dense Medium Cyclones, IEEEE Conference: Signal Processing and Its Applications, 2005. Proceedings of the Eighth International Symposium on vol. 2 (Year: 2005).*

*Primary Examiner* — David L Singer
(74) *Attorney, Agent, or Firm* — Morriss O'Bryant Compagni Cannon PLLC

(57) ABSTRACT

Disclosed is a hydrocyclone monitoring system. The hydrocyclone monitoring system comprises a hydrocyclone comprising a separation chamber having an inlet for feeding an input mixture into the separation chamber and first and second outlets for ejecting flows of 5 respective first and second components of the mixture from the separation chamber. The hydrocyclone monitoring system further comprises a conduit and a sensor assembly. The conduit is connected to the first outlet and defines a channel for conducting the flow of the first component ejected from the separation chamber. The sensor assembly is configured to detect characteristics of the flow of the first component in the (Continued)

channel. The hydrocyclone 10 monitoring system further comprises a processing system configured to receive from the sensor assembly measurement data indicative of the characteristics of the flow of the first component, and to determine a mode of operation of the hydrocyclone based on the measurement data. Also disclosed is a method of monitoring a hydrocyclone.

25 Claims, 23 Drawing Sheets

(51) Int. Cl.
  *G01H 1/14* (2006.01)
  *G01H 3/06* (2006.01)
  *G01H 3/12* (2006.01)
  *B01D 21/26* (2006.01)
  *B04C 11/00* (2006.01)

(52) U.S. Cl.
  CPC ............... *G01H 3/06* (2013.01); *G01H 3/12* (2013.01); *B04C 11/00* (2013.01)

(58) Field of Classification Search
  CPC .. G01H 1/00; G01H 1/14; G01H 3/00; G01H 3/04; G01H 3/06; G01H 3/12; G01M 7/00; G01M 7/025; G01N 1/2211; G01N 29/036; G01N 29/046
  See application file for complete search history.

(56) References Cited

U.S. PATENT DOCUMENTS

| | | | |
|---|---|---|---|
| 2005/0173354 A1* | 8/2005 | Binot | G01N 29/046 210/788 |
| 2012/0209550 A1* | 8/2012 | Van Der Spek | B04C 11/00 702/63 |
| 2013/0220938 A1* | 8/2013 | Castro | B04C 11/00 210/741 |
| 2014/0151274 A1* | 6/2014 | Hadfield | G01N 29/222 210/85 |
| 2017/0089496 A1* | 3/2017 | Lennon | F16L 13/146 |
| 2017/0239594 A1* | 8/2017 | Bowers | B04C 11/00 |
| 2018/0010945 A1* | 1/2018 | Maron | B03D 1/028 |
| 2018/0272362 A1* | 9/2018 | Cirulis | B04C 11/00 |
| 2019/0176167 A1* | 6/2019 | Buttler | G01H 1/00 |
| 2020/0018625 A1* | 1/2020 | Davis | B04C 9/00 |

FOREIGN PATENT DOCUMENTS

| | | | |
|---|---|---|---|
| CN | 103442811 A | 12/2013 | |
| CN | 105057127 A | 11/2015 | |
| EP | 1161999 A1 * | 12/2001 | G01P 5/02 |
| EP | 1161999 A1 | 12/2001 | |
| JP | H05264301 A | 10/1993 | |
| WO | 2017053712 A1 | 3/2017 | |
| WO | 2017197451 A1 | 11/2017 | |
| WO | WO-2017197451 A1 * | 11/2017 | B04C 11/00 |

* cited by examiner

HYDROCYCLONE VIBRATION MONITORING SYSTEM AND METHOD

CROSS-REFERENCE TO RELATED APPLICATIONS

This application is a national phase entry under 35 U.S.C. § 371 of PCT/AU2019/050228, filed Mar. 14, 2019, which claims priority to U.S. provisional application No. 62/643,659, filed Mar. 15, 2018, the entire contents of which are incorporated herein by reference.

TECHNICAL FIELD

The present invention generally relates to a hydrocyclone. In further specific examples, the present invention relates to a system and a method of monitoring a hydrocyclone.

BACKGROUND

Hydrocyclones are commonly used for separating suspended matter carried in a liquid into multiple discharge streams or "phases" of different density. In the mining industry, for example, hydrocyclones may be used to separate particulates that are located in a slurry into a heavier ("coarser") solid phase and a lighter ("finer") solid phase, for classification purposes. Hydrocyclones may have different modes of operation. Some modes of operation are desired while some are not desired. Such undesired modes of operation may result in increased wear and tear on equipment, and may require additional processing.

During normal, stable operation of a hydrocyclone, slurry enters through an upper inlet of a hydrocyclone separation chamber in the form of an inverted cone, with the heavier solid phase being discharged through a lower outlet ("underflow") and the lighter solid phase being discharged through an upper outlet ("overflow"). However, the stability of a hydrocyclone during such an operation can be readily disrupted, resulting in an ineffective separation process whereby either an excess of fine particulates exit through the lower outlet or courser particulates exit through the upper outlet.

One form of unstable operation is known as "roping", whereby the rate of solids being discharged through the lower outlet increases to a point where the flow is impaired. If corrective measures are not timely adopted, the accumulation of solids through the outlet will build up in the separation chamber, the internal air core will collapse and the lower outlet will discharge a coarse, rope-shaped flow of coarse solids. Roping may also result in the undesired effect of some or a substantial part of the heavier phase being discharged through the upper outlet. A number of different operational conditions can cause roping, some of which include changes in the composition and viscosity of the slurry and increases in slurry feed speed.

Another form of unstable operation is where the proportion of fine material being incorrectly discharged through the lower outlet progressively increases to an unacceptable level. This form of unstable operation can be caused, for example, as a result of changes in the composition and viscosity of the input slurry, decreases in the slurry feed speed, and so on.

Both of the example unstable operating conditions described above can have serious adverse impacts on downstream processes, often requiring additional processing (which, as will be appreciated, can greatly negatively impact profits) and also result in accelerated machinery wear.

There is a need for new or improved systems and/or methods of monitoring the operation of a hydrocyclone.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one example aspect, there is provided a hydrocyclone monitoring system comprising: a hydrocyclone comprising a separation chamber having an inlet for feeding an input mixture into the separation chamber and first and second outlets for ejecting flows of respective first and second components of the mixture from the separation chamber; a conduit connected to the first outlet, the conduit defining a channel for conducting the flow of the first component ejected from the separation chamber; a sensor assembly configured to detect characteristics of the flow of the first component in the channel; a processing system configured to receive from the sensor assembly measurement data indicative of the characteristics of the flow of the first component, and to determine a mode of operation of the hydrocyclone based on the measurement data.

In certain embodiments, the first outlet is an overflow outlet of the hydrocyclone.

In certain embodiments, the second outlet is an underflow outlet of the hydrocyclone.

In certain embodiments, the mode of operation of the hydrocyclone comprises characteristics of the flow of the second component.

In certain embodiments, the characteristics of the flow of the second component comprise a shape of the flow of the second component as it exits the second outlet.

In certain embodiments, the shape is one of a roping, semi-roping, and splashing shape.

In certain embodiments, the characteristics of the flow of the first component comprise vibrations imparted by the flow of the first component to the sensor assembly.

In certain embodiments, the processing system is configured to determine the mode of operation of the hydrocyclone by analysing frequency characteristics of the vibrations.

In certain embodiments, the processing system is configured to detect the presence of one or more frequency components of the vibration in one or more frequency bands.

In certain embodiments, a frequency band of the one or more frequency bands is from about 10 Hz to about 20 Hz.

In certain embodiments, a frequency band of the one or more frequency bands is from about 20 Hz to about 30 Hz.

In certain embodiments, the processing system is configured to determine the mode of operation of the hydrocyclone by analysing amplitude characteristics of the vibrations.

In certain embodiments, the sensor assembly comprises a membrane in communication with the channel and a vibrations sensor operatively coupled to the membrane for detecting vibrations of the membrane.

In certain embodiments, the membrane is extended about a perimeter of the channel.

In certain embodiments, the membrane is extended about a recess in a sidewall of the conduit.

In certain embodiments, the membrane is contiguous with a perimeter of the recess such that the combination of the conduit and the membrane define the channel.

In certain embodiments, the recess defines a second channel having a closed end, the second channel being in communication with the channel such that a portion of the flow of the first component diverts into the second channel and returns to the channel.

In certain embodiments, the membrane extends about the closed end.

In certain embodiments, the second channel is perpendicular to the channel defined by the conduit.

In certain embodiments, the membrane is an elastic membrane.

In certain embodiments, the vibrations sensor is an accelerometer.

In certain embodiments, the membrane comprises a first surface in communication with the channel, and a second surface opposite the first surface and facing away from the channel.

In certain embodiments, the vibrations sensor is attached to the second surface.

In certain embodiments, the hydrocyclone monitoring system further comprises an actuator for controlling a flow of the input mixture through the inlet, wherein the processing system is further configured to operate the actuator based on the determined mode of operation of the hydrocyclone.

In certain embodiments, the conduit is an adapter for connecting the first output to a pipe.

In certain embodiments, the conduit is a pipe connected to the first output.

According to another example aspect, there is provided a method of monitoring a hydrocyclone comprising a separation chamber having an inlet for feeding an input mixture into the separation chamber and first and second outlets for ejecting flows of respective first and second components of the mixture from the separation chamber, the method comprising: conducting the flow of the first component ejected from the separation chamber through a channel defined by a conduit connected to the first outlet; detecting, using a sensor assembly, characteristics of the flow of the first component in the channel; determining a mode of operation of the hydrocyclone based on the detected characteristics of the flow of the first component.

In certain embodiments, the first outlet is an overflow outlet of the hydrocyclone.

In certain embodiments, the second outlet is an underflow outlet of the hydrocyclone.

In certain embodiments, the mode of operation of the hydrocyclone comprises characteristics of the flow of the second component.

In certain embodiments, the characteristics of the flow of the second component comprise a shape of the flow of the second component as it exits the second outlet.

In certain embodiments, the shape is one of a roping, semi-roping, and splashing shape.

In certain embodiments, the characteristics of the flow of the first component comprise vibrations imparted by the flow of the first component to the sensor assembly.

In certain embodiments, determining the mode of operation of the hydrocyclone comprises analysing frequency characteristics of the vibrations.

In certain embodiments, analysing frequency characteristics of the vibrations comprises detecting the presence of one or more frequency components of the vibration in one or more frequency bands.

In certain embodiments, a frequency band of the one or more frequency bands is from about 10 Hz to about 20 Hz.

In certain embodiments, a frequency band of the one or more frequency bands is from about 20 Hz to about 30 Hz.

In certain embodiments, determining the mode of operation of the hydrocyclone comprises analysing amplitude characteristics of the vibrations.

In certain embodiments, the sensor assembly comprises a membrane in communication with the channel and a vibrations sensor operatively coupled to the membrane for detecting vibrations of the membrane.

In certain embodiments, the membrane is extended about a perimeter of the channel.

In certain embodiments, the membrane is extended about a recess in a sidewall of the conduit.

In certain embodiments, the membrane is contiguous with a perimeter of the recess such that the combination of the conduit and the membrane define the channel.

In certain embodiments, the recess defines a second channel having a closed end, the second channel being in communication with the channel such that a portion of the flow of the first component diverts into the second channel and returns to the channel.

In certain embodiments, the membrane extends about the closed end.

In certain embodiments, the second channel is perpendicular to the channel defined by the conduit.

In certain embodiments, wherein the membrane is an elastic membrane.

In certain embodiments, the vibrations sensor is an accelerometer.

In certain embodiments, the membrane comprises a first surface in communication with the channel, and a second surface opposite the first surface and facing away from the channel.

In certain embodiments, the vibrations sensor is attached to the second surface.

In certain embodiments, the method further comprises operating an actuator for controlling a flow of the input mixture through the inlet based on the determined mode of operation of the hydrocyclone.

In certain embodiments, wherein the conduit is an adapter for connecting the first output to a pipe.

In certain embodiments, the conduit is a pipe connected to the first output.

According to another example aspect, there is provided a sensor assembly for a hydrocyclone comprising: a membrane attachable to a sensor assembly stub of an overflow outlet pipe of the hydrocyclone; the membrane comprising: a drum head member configured to move in response to vibrations of a fluid in the overflow outlet pipe; and an attachment rim configured to be selectively mechanically connectable to the overflow outlet pipe; an accelerometer attachment configured to retain an accelerometer in mechanical communication with the membrane whereby the vibrations are detectable; and a membrane attachment comprising a flange configured to retain the membrane against the overflow outlet pipe proximate to the attachment rim.

According to another example aspect, there is provided a method of detecting an operating characteristic of a hydrocyclone, the method comprising: providing a membrane in communication with a fluid chamber of the hydrocyclone;

detecting vibration of the membrane; and ascertaining the operating characteristic based on the detected vibrations.

In certain embodiments, the step of providing a membrane in communication with a fluid chamber of the hydrocyclone includes providing the membrane on an overflow pipe of the hydrocyclone.

According to another example aspect, there is provided a membrane assembly for coupling to an overflow pipe of a hydrocyclone, the membrane assembly comprising: a membrane; a membrane mount configured to mount and maintain the membrane parallel to an air core of the hydrocyclone; and a sensor mount for mounting a vibration sensor thereto.

In certain embodiments, the sensor mount is centrally located on the membrane.

Other aspects, features, and advantages will become apparent from the following Detailed Description when taken in conjunction with the accompanying drawings, which are a part of this disclosure and which illustrate, by way of example, principles of the various embodiments.

BRIEF DESCRIPTION OF FIGURES

Example embodiments are apparent from the following description, which is given by way of example only, of at least one non-limiting embodiment, described in connection with the accompanying figures.

DETAILED DESCRIPTION

Figure 1:
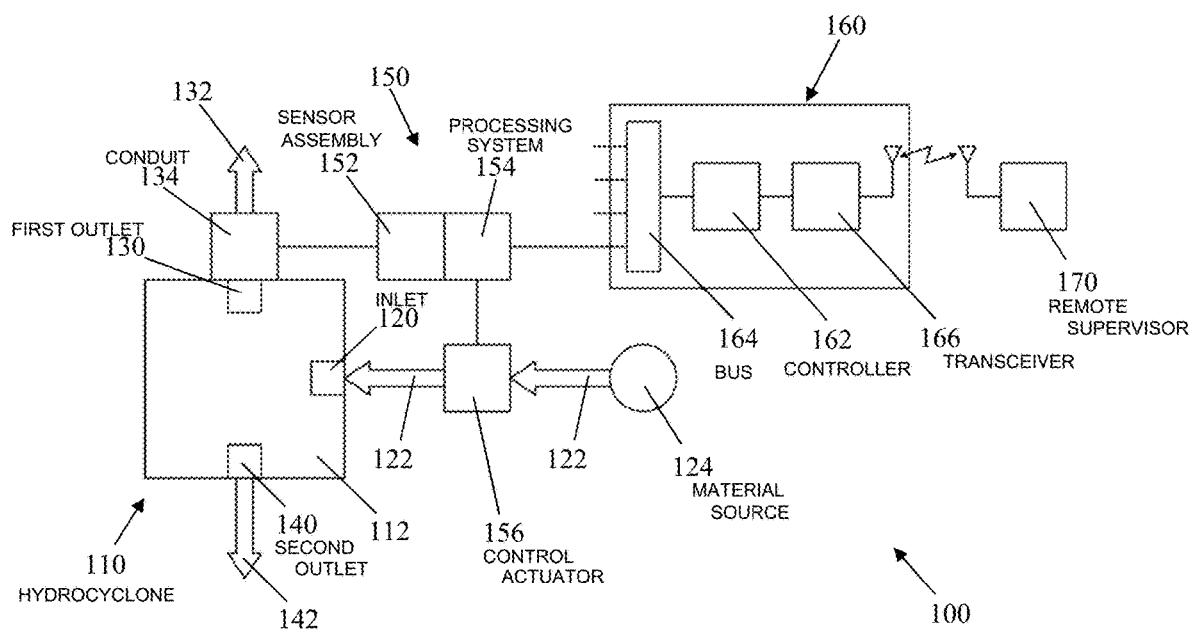
FIG. 1 illustrates a block schematic of an example hydrocyclone monitoring system.

The following modes, given by way of example only, are described in order to provide a more precise understanding of the subject matter of an embodiment or embodiments. In the figures, incorporated to illustrate features of an example embodiment, like reference numerals are used to identify like parts throughout the figures.

Referring to FIG. 1, there is illustrated an example hydrocyclone monitoring system 100. Monitoring system 100 comprises one or more hydrocyclones 110. Hydrocyclone 110 may include, in one embodiment, a body with a separation chamber 112 having an inlet 120, a first outlet 130, and a second outlet 140. Inlet 120 allows an input mixture 122 to enter, or flow into, separation chamber 112. The mixture may be a semifluid mixture or a particulate bearing mixture, such as a particulate slurry. As the mixture moves through separation chamber 112, it is separated into two components or phases. The two components may comprise particulates of different size, density, or weight. A first component comprising mainly light particulates is ejected, or outputted, through first outlet 130, termed an overflow outlet. A second component comprising mainly heavy particulates is ejected, or outputted, through second outlet 140, termed an underflow outlet.

In some examples, first or overflow outlet 130 is centrally located in an upper wall, or an upper end, of separation chamber 112, while second or underflow outlet 140 is centrally located at a lower end of separation chamber 112. Hydrocyclone 110 is arranged to generate an internal air core around which the input mixture circulates. In some examples, separation chamber 112 comprises a chamber having a conical shape, a cylindroconical shape, a frusto-conical shape, or a cylindro-frusto-conical shape. In other examples, separation chamber 112 may have any other shape or configuration to enable or to facilitate separation of input mixture 122 into two components.

During stable operation, hydrocyclone 110 operates such that a first component flow 132 is discharged through the first outlet 130. First component flow 132 may have a lighter solid phase of material and/or a liquid phase of material. Similarly, a second component flow 142 is discharged through the second outlet 140. Second component flow 142 may be a heavier solid phase of material.

First component 132 and second component 142, having different material properties, may flow from first outlet 130 and second outlet 140, respectively, with different component, or material, flow characteristics. However, one may appreciate that characteristics of the flows of first component 132 and second component 142 may be related. For instance, a first component flow characteristic and/or a second component flow characteristic may comprise a volume, a flow rate, a particle motion aspect, such as a spray pattern, a vibration having an amplitude and period, and/or the like.

Notably, a vibration of first component 132 flow (e.g., a flow characteristic of first material component 132) may be related to a second component 142 flow characteristic, such as a spray pattern, of second material flow 142. In other words, because inlet 120 is in fluidic communication with both first outlet 130 and second outlet 140, characteristics of material and material behaviour exiting first outlet 130 may affect other characteristics of material and/or material behaviour exiting second outlet 140, as may characteristics of material and material behaviour exiting second outlet 140 affect other characteristics of material and/or material behaviour exiting first outlet 130.

Consequently, a measurement of a vibration, such as an amplitude, a period, an acceleration, a waveform, or any other characteristic connected with the material exiting from one outlet may be related to other behaviour of the material exiting another outlet. Specifically, the amplitude, the period, and/or the acceleration of vibrations (first material flow characteristic) transmitted through first component flow 132 exiting hydrocyclone 110 via first outlet 130 may correspond to whether second component flow 142 exiting second outlet 140 has desired, or undesired second material flow characteristics 142.

To this end, monitoring system 100 further comprises a local measurement unit 150 comprising a sensor assembly 152 and a processing system 154. Sensor assembly 152 is configured to detect, measure, or sense characteristics of the flow of the first component within a conduit 134. Conduit 134 is connected to first output 130 and defines a channel for conducting the flow of first component 132 ejected from separation chamber 112. Conduit 134 may guide the flow of first component 132 from separation chamber 112 to, for example, a container for collecting first component 132. Similarly, in some examples, another conduit may be connected to second output 140 for guiding second component 142 to, for example, another container. In other examples, second output 140 faces a downwards direction, and second component 142 falls under gravity through second output 140 into a container for collection.

In some examples, conduit 134 is an adapter, or overflow adapter, for connecting first output 130 to a pipe. In other examples, conduit 134 is a pipe connected to first output 130. In yet other examples, conduit 134 comprises an adapter and a pipe connected to first output 130 through the adapter. In some examples, sensor assembly 152 is mounted to conduit 134 and is in communication with the channel defined by conduit 134, to allow it to directly measure characteristics of the flow of first component 132. It may be advantageous for sensor assembly 152 to be mounted to an adapter, such as an overflow adapter of conduit 134, because it allows sensor assembly 152 to be installed without the need to replace the whole pipe connected to overflow outlet 130 of hydrocyclone 110. It will be appreciated that it may be more convenient to replace the adapter, which is typically smaller and lighter than the whole pipe, with another adapter configured for the mounting of sensor assembly 152 instead of replacing the whole pipe.

Processing system 154 is operatively coupled to, and preferably in electronic communication with, sensor assembly 152. Sensor assembly 152 may be located in proximity to sensor assembly 152 and/or hydrocyclone 110, and may therefore be termed a local processing system. Processing system 154 may be any electronic processor configured to be electronically communicative to aspects of sensor assembly 152 to detect characteristics of the flow of first component 132 passing through the channel defined by conduit 134. In some examples, processing system 154 is configured to receive from sensor assembly 152 measurement data indicative of the characteristics of the flow of first component 132. Processing system 154 may comprise an ARDUINO processor, although any suitable processor is contemplated.

Processing system 154 is further operatively coupled to a regional centralized control unit 160. Regional centralized control unit 160 may comprise a controller and/or humanmachine interface and may be remotely disposed from local measurement unit 150 of hydrocyclone 110. Regional centralized control unit 160 comprises a controller 162 configured to interoperate with one or more local measurement units associated with one or more hydrocyclones, including local measurement unit 150 associated with hydrocyclone 110. The one or more measurement units may be connected by a bus 164 of centralized control unit 160 to controller 162. Controller 162 may interoperate with a transceiver 166 to communicate to a remote supervisor 170 remotely disposed from the other aspects of regional centralized control unit 160.

Monitoring system 100 further comprises an actuator, or effector, 156 for controlling a flow of the input mixture through inlet 120. Actuator 156 is therefore interposed between inlet 120 and a material source 124 of input mixture 122 (e.g. a fluid source). Material source 124 may comprise a source of a particulate slurry, such as mined minerals, rock, soil, and/or the like. In some examples, actuator 156 comprises a valve (such as a control valve) or a gate for restricting or facilitating the flow of the input mixture 122 from material source 124 to inlet 120.

Processing system 154 is configured to operate actuator 156 based on a determined mode of operation of hydrocyclone 110. Actuator 156 may receive operating instructions from processing system 154 (or elsewhere in other embodiments) and may change aspects of the input mixture flow, such as by actuating to restrict the flow of input mixture flow 122 into inlet 120, or to change other flow characteristics as desired or needed. In some examples, actuator 156 forms part of local measurement unit 150, even though it may be located in a separate location from sensor assembly 152 and processing system 154.

Processing system 154 is configured to determine a mode of operation of hydrocyclone 110 based on the measurement data, or on the characteristics of the flow of first component 132, as detected by sensor assembly 152. The mode of operation of hydrocyclone 110 may comprise characteristics of the flow of second component 142 from second outlet 140. Such characteristics may include a flow shape.

One notable observed characteristic of stable hydrocyclone operation is that the heavier solid phase during stable operation will exhibit a more constant umbrella-shaped spray pattern as it exits the apex of the lower (or underflow) outlet 140. In other words, the spray pattern may be said to show a "splash" characteristic rather than a "roping" or a "semi-roping" characteristic.

Figure 2A:
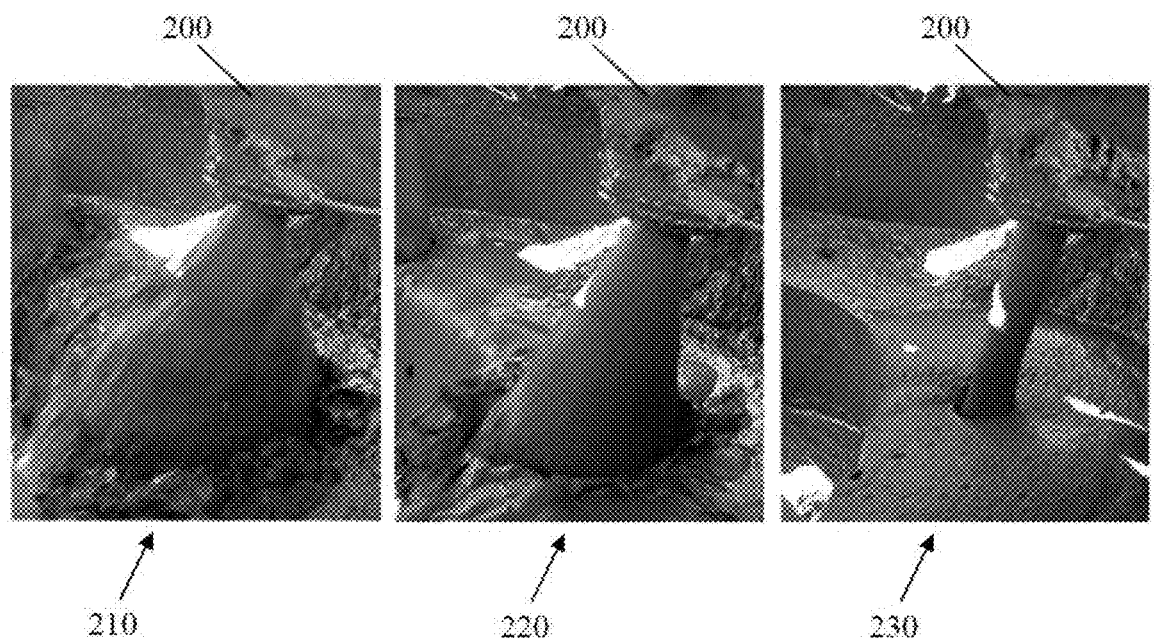
FIG. 2A are photographs illustrating example flow shapes of underflow material ejected from an underflow outlet of a hydrocyclone.
Figure 2B:
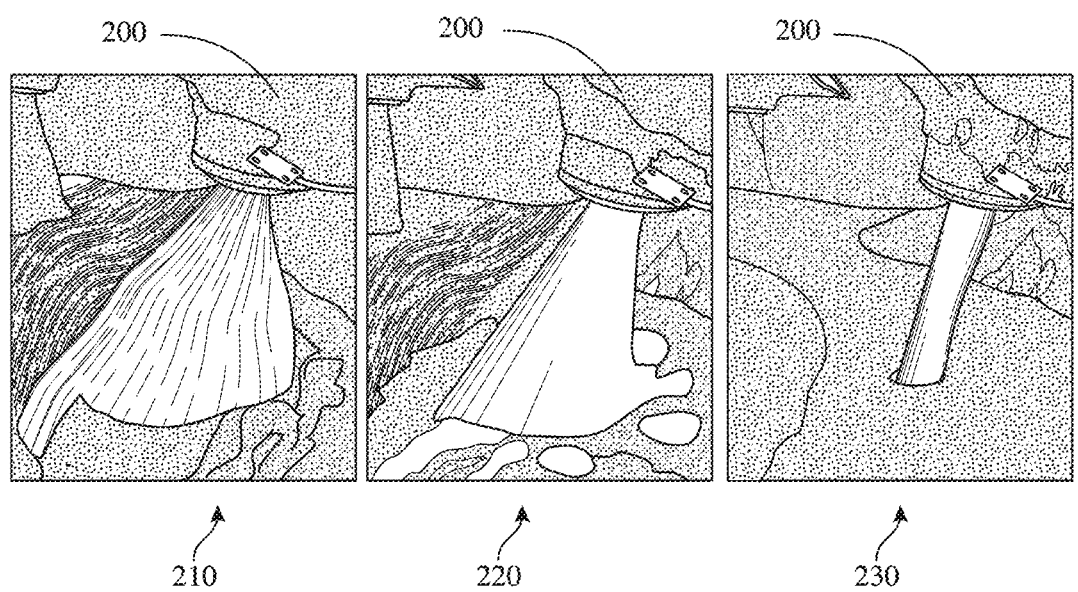
FIG. 2B are line-drawing depictions of the flow shapes illustrated in the photographs of FIG. 2A.

For example, referring to FIG. 2, there is illustrated example flow shapes of an underflow ejected from an underflow outlet 200 of a hydrocyclone. Shape 210 corresponds to splashing; shape 220 corresponds to semi-roping; and shape 230 corresponds to roping. Generally, it is undesirable for a hydrocyclone to operate in roping mode. Instead, it may be preferable for the hydrocyclone to operate either in splashing or semi-roping mode.

In some examples, the sensor assembly 152 may be configured to detect a first component flow characteristic as it passes through overflow outlet piping 132 connected to the overflow outlet 130 in order to adjust a rate or volume or other aspect of the input material flow so that a second component flow characteristic achieves a desired flow shape as it leaves the underflow outlet 140. In some examples, local measurement unit 150 also affects an aspect of the input flow material in response to the sensing.

In some examples, the characteristics of the flow of first component 132 comprise vibrations imparted by the flow of first component 132 to sensor assembly 152. That is, sensor assembly 152 detects or measures vibrations in the flow of first component 132 as it travels through conduit 134. Notably, vibrations in the flow of first component 132 may be related to vibrations of the air core in separation chamber 112. In contrast, the vibration characteristics of the air core may be independent and different from vibrations in the physical components of hydrocyclone 110. For example, the air core in separation chamber 112 may vibrate with the same frequency as the vibrations of the flow of first component 132, but with a different frequency from the body of separation chamber 112 or conduit 134. Therefore, by measuring vibrations in the flow of first component 132, one may determine the stability of the air core, and the mode or state of operation of hydrocyclone 110.

Based on the vibrations measurement data collected by sensor assembly 152, processing system 154 may be able to determine a mode of operation of hydrocyclone 110, where the mode of operation corresponds to a shape of flow of second component 142 from second outlet 140 (e.g. splashing, semi-roping, or roping). Processing system 154 may then control actuator 156 to maintain, adjust, or change the mode of operation of hydrocyclone 110.

In the context of the specification, it will be understood that the term vibration or vibrational is to be construed broadly and include within its scope any oscillatory displacement or movement and as such can correspond (depending on the magnitude) to variations in displacement as a function of time and/or speed and/or acceleration.

Figure 3:
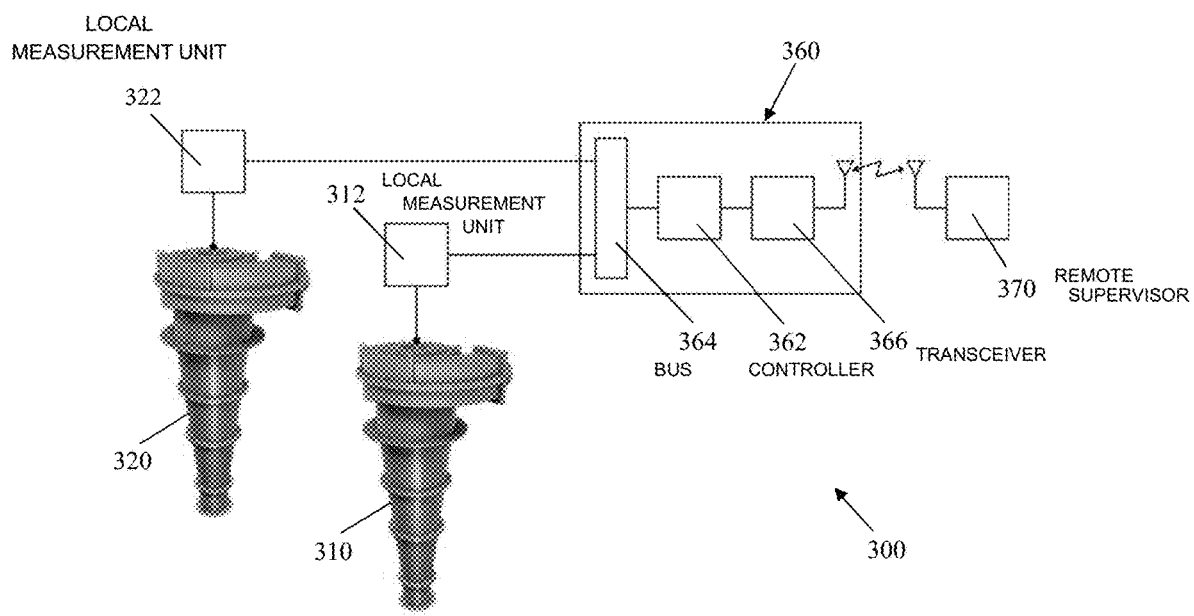
FIG. 3 illustrates a block schematic of an example system for monitoring and/or controlling a hydrocyclone.

Referring to FIG. 3, there is illustrated an example hydrocyclone control system 300 for monitoring and/or controlling modes of operation of a plurality of hydrocyclones. The plurality of hydrocyclones comprises a first hydrocyclone 310 and a second hydrocyclone 320, although, in other examples, any number of hydrocyclones may be provided, such as one, two, three, or more. Each hydrocyclone has an associated local measurement unit 312 and 322, which includes a sensor assembly configured to detect characteristics of the flow of one output of the hydrocyclone, and a processing system configured to determine a mode of operation of the hydrocyclone using measurement data received from the sensor assembly. Each local measurement unit may further comprise an actuator for controlling a flow of material into each hydrocyclone's inlet.

Control system 300 comprises a regional centralized control unit 360, which may comprise a controller 362 configured to interoperate with local measurement units 312 and 322. Local measurement units 312 and 322 are connected by a bus 364 of the centralized control unit 360 to the controller 362.

The controller 362 may interoperate with a transceiver 366 to communicate to a remote supervisor 370 remotely disposed from the other aspects of centralized control unit 360. For instance, a plurality of local measurement units including 312 and 322 may be spread or distributed at various locations throughout a site, for instance, a site that has multiple hydrocyclones including 310 and 320. The site may have a regional centralized control unit 360 receiving data from each local measurement unit 312 and 322 and processing and aggregating that data for communication with remote supervisor 370. Similarly, the regional centralized control unit 360 may receive data from the remote supervisor and direct it and/or instructions based on it, to local measurement units 312 and 322, for example, to separately control operation of different sensor assemblies and actuators associated with effectors hydrocyclones 310 and 320.

Remote supervisor 370 may comprise a centralized command facility interoperable with a variety of sites. In this manner, each hydrocyclone 310 and 320 may be controlled individually; however, network congestion, and processor load and energy consumption may be managed through the use of regional centralized control unit 360 to coordinate transmission and reception of data away from the site via the transceiver 112.

Each measurement unit 312 and 322 may have a local processing system configured to perform time domain analysis and/or frequency domain analysis, such as by periodically sampling a signal and performing a Fourier transform on the signal. In this way, the local processing system may be able to determine an operating mode of its respective hydrocyclone (e.g. hydrocyclone 310 or 320). Each local processing system may further interoperate with regional centralized control unit 360 and remote supervisor 370 to document operating characteristics, to analyze the operating characteristics, and/or direct an actuator associated with each hydrocyclone to operate to change the operating characteristics of the associated hydrocyclone.

Figure 4:
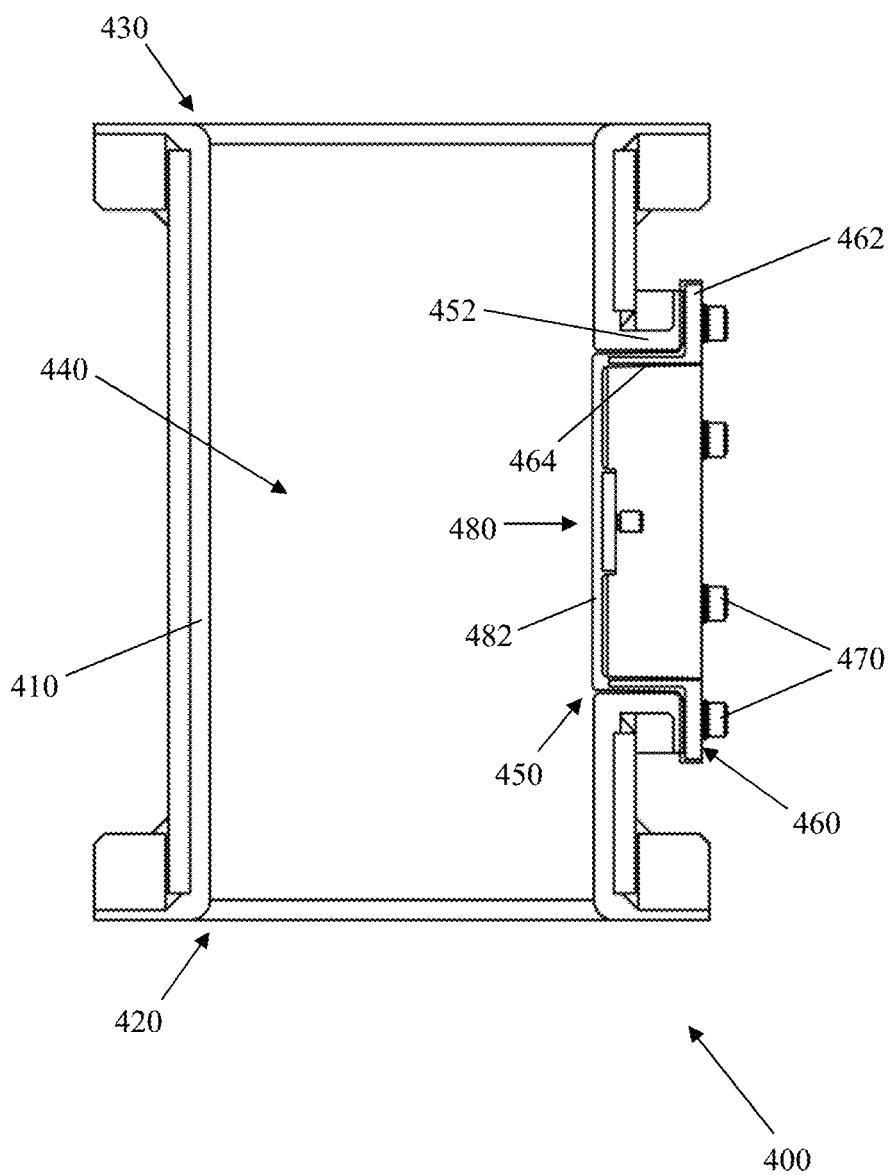
FIG. 4 illustrates a section view of an example overflow adapter.
Figure 5:
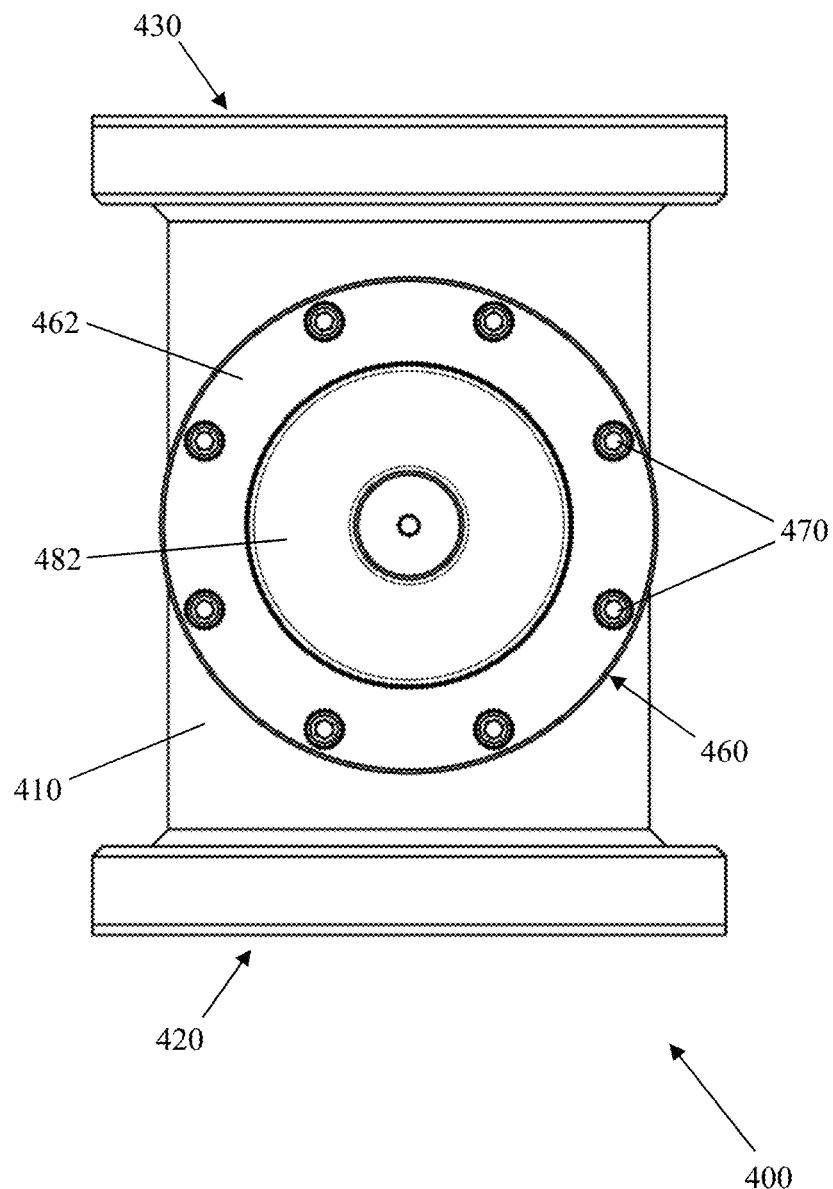
FIG. 5 illustrates a side view of the overflow adapter of FIG. 4.
Figure 6:
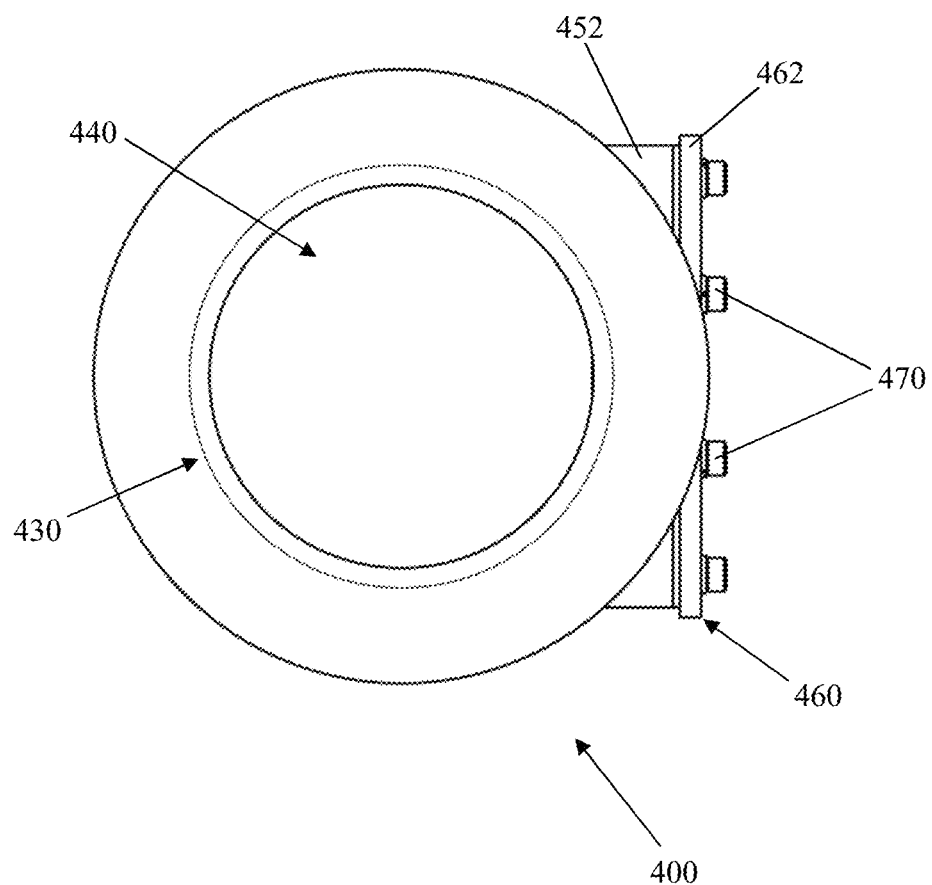
FIG. 6 illustrates a top view of the overflow adapter of FIG. 4.

Referring to FIGS. 4 to 6, there is illustrated an adapter 400, or overflow adapter, for connecting a pipe to an overflow outlet of a hydrocyclone. Adapter 400 comprises a cylindrical body 410 having a first open end 420 and a second open end 430. First open end 420 is adapted to couple to the overflow outlet of the hydrocyclone, while second end 430 is adapted to couple to a pipe. Body 410 defines a channel 440 for conducting the flow of overflow material ejected from the overflow outlet. During normal operation, the overflow material enters adapter 400 through first open end 420 and exits through second open end 430 into a corresponding channel of the pipe.

Adapter 400 further comprises a recess, bore, or opening 450 in a sidewall of body 410. A sensor support member 460 is fixed to body 410 across recess 450 with bolts 470. A lip 452 of the sidewall of body 410 projects away from channel 440, providing a mounting surface for fixing sensor support member 460. Sensor support member 460 comprises a collar 462 with a plurality of holes distributed around the collar for allowing the passage of bolts 470. Collar 462 overlaps lip 452, which also comprises a plurality of holes configured to receive bolts 470. Sensor support member 460 further comprises a flange 464. When sensor support member 460 is mounted to lip 452, flange 464 extends proximally to an edge of recess 450. Flange 464 provides a mounting portion for sensor assembly 480 (described below).

Sensor assembly 480 comprises a membrane 482 (which may comprise an elastomer membrane) that extends over recess 450 and is attached to flange 464. Membrane 482 is contiguous with a perimeter of recess 450 such that the combination of body 410 and membrane 482 define channel 440. Membrane 482, when mounted to sensor support member 460, seals recess 450, thus preventing overflow material or fluid from exiting adapter 400 through recess 450.

Membrane 482 is in communication with channel 440 and extends about a perimeter of channel 440. That is, membrane 482 is located in a periphery, or external boundary, of channel 440, in the vicinity of the sidewall of body 410. In some examples, membrane 482 does not extend or project into channel 440. In this way, membrane 482 does not impede or obstruct the flow of overflow material through channel 440. However, being in communication with channel 440, membrane 482 comes into contact with overflow material (as the overflow material flows from first open end 420 to the second open end 430) and can therefore be used to directly measure, for example, a vibration of the overflow material (e.g. a vibration or pulsation of the overflow material transverse to the mean direction of flow of the overflow material through channel 440). In some examples, the vibration of the overflow material flowing through adapter 400 is directly related to the vibration of the air core in the separation chamber of the hydrocyclone.

Figure 7:
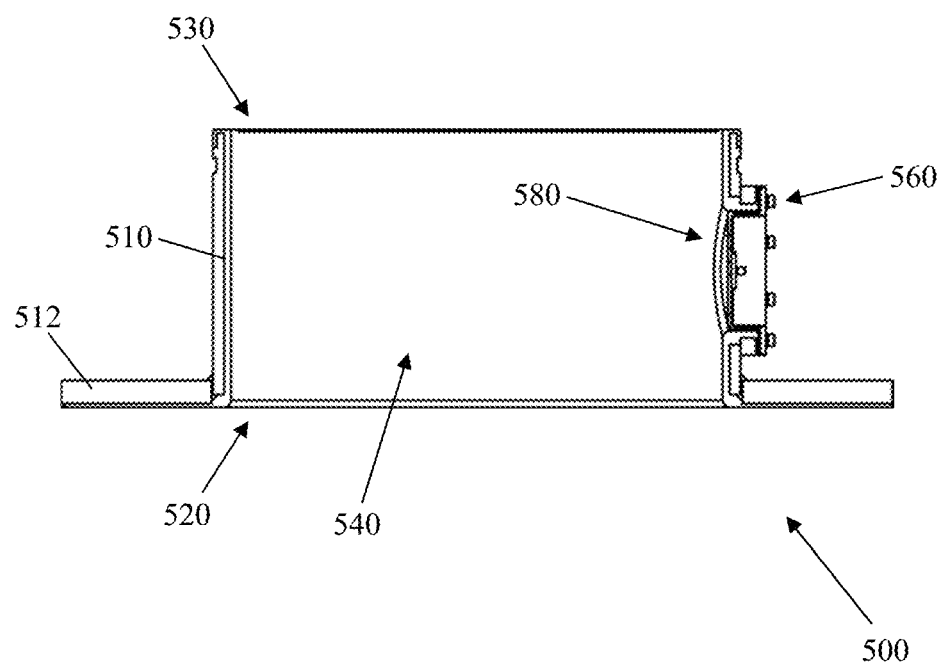
FIG. 7 illustrates a section view of another example overflow adapter.
Figure 8:
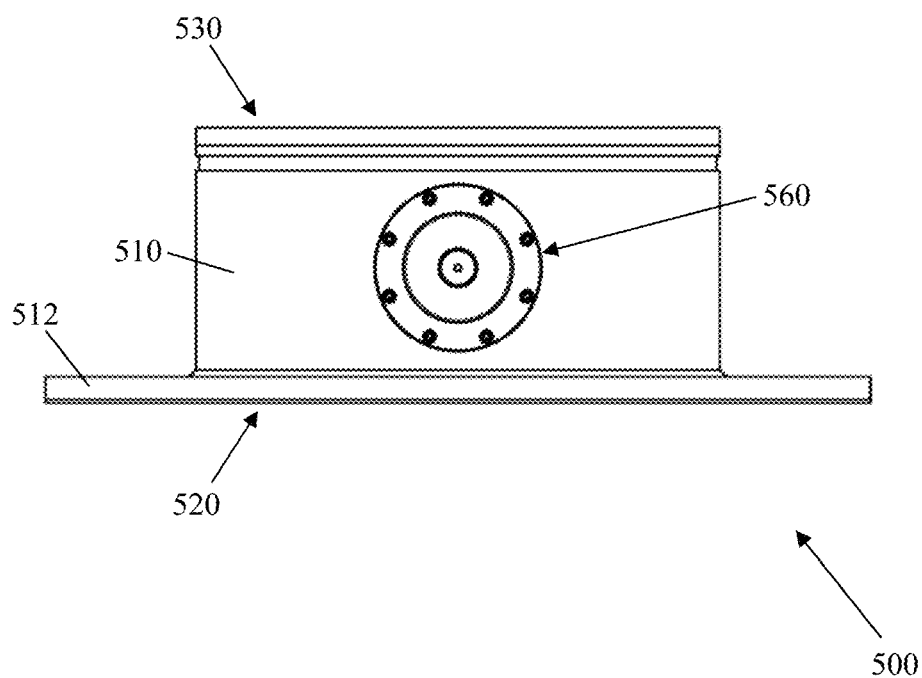
FIG. 8 illustrates a side view of the overflow adapter of FIG. 7.
Figure 9:
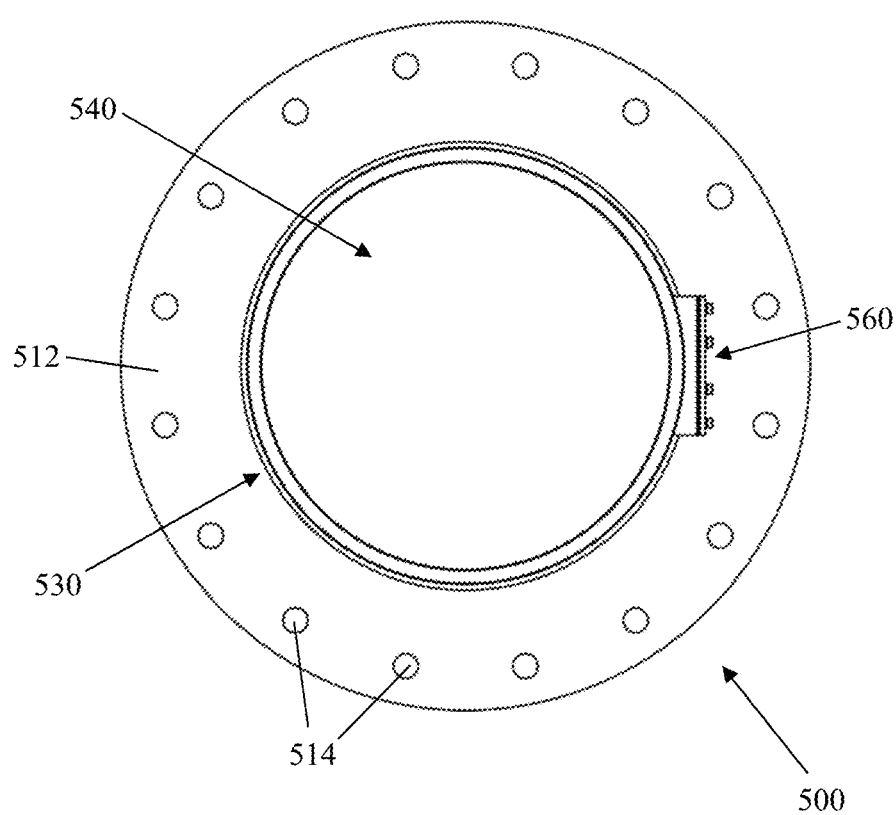
FIG. 9 illustrates a top view of the overflow adapter of FIG. 7.

Referring to FIGS. 7 to 9, there is illustrated another adapter 500, or overflow adapter, for connecting a pipe to an overflow outlet of a hydrocyclone. Adapter 500 comprises a cylindrical body 510 having a first open end 520 and a second open end 530. First open end 520 is adapted to couple to the overflow outlet of the hydrocyclone, while second end 530 is adapted to couple to a pipe. Body 510 defines a channel 540 for conducting the flow of overflow material ejected from the overflow outlet. During normal operation, the overflow material enters adapter 500 through first open end 520 and exits through second open end 530 into a corresponding channel of the pipe. Body 510 comprises a flat rim 512 in proximity to first open 520 and projecting outwardly from channel 540. Rim 512 comprises a plurality of holes 514 for bolts for fixing adapter 500 to the hydrocyclone.

Adapter 500 further comprises a sensor support member 560 fixed to body 510 and a sensor assembly 580 mounted to sensor support member 560. The configuration of sensor support member 560 and sensor assembly 580 is similar to the one described with reference to FIGS. 4 to 6.

Figure 10:
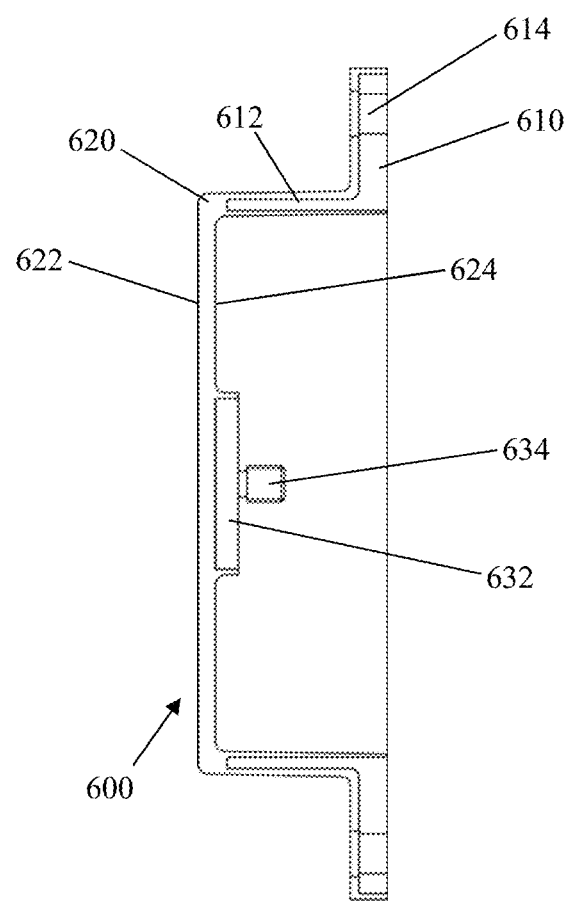
FIG. 10 illustrates a section view of an example sensor assembly mounted to an example sensor support member.
Figure 11:
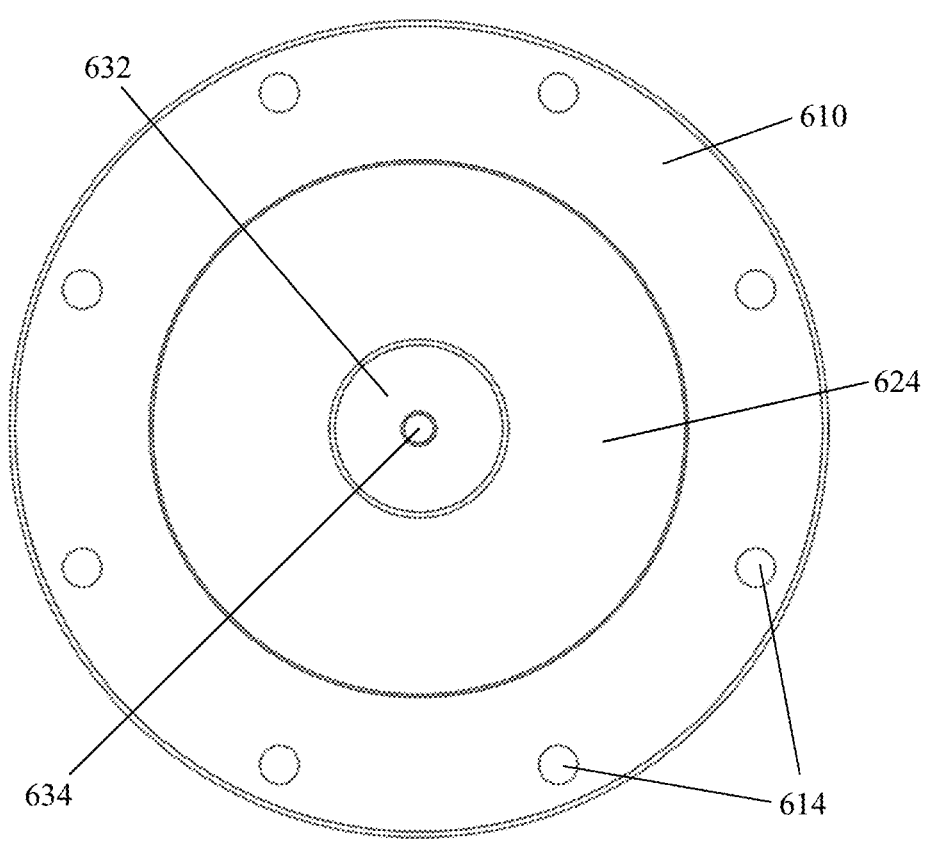
FIG. 11 illustrates a side view of the sensor assembly mounted to the sensor support member of FIG. 10.
Figure 12:
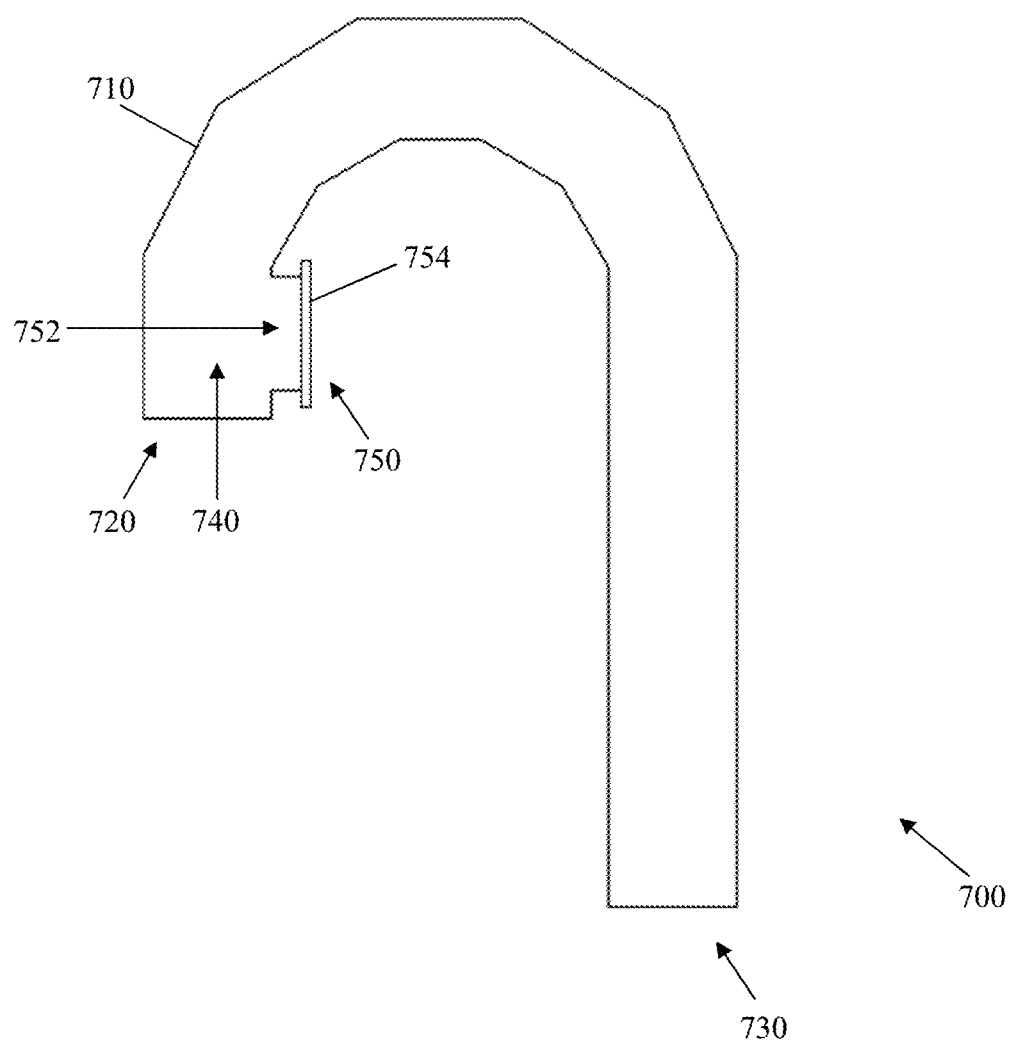
FIG. 12 illustrates a front view of an example overflow outlet pipe.
Figure 13:
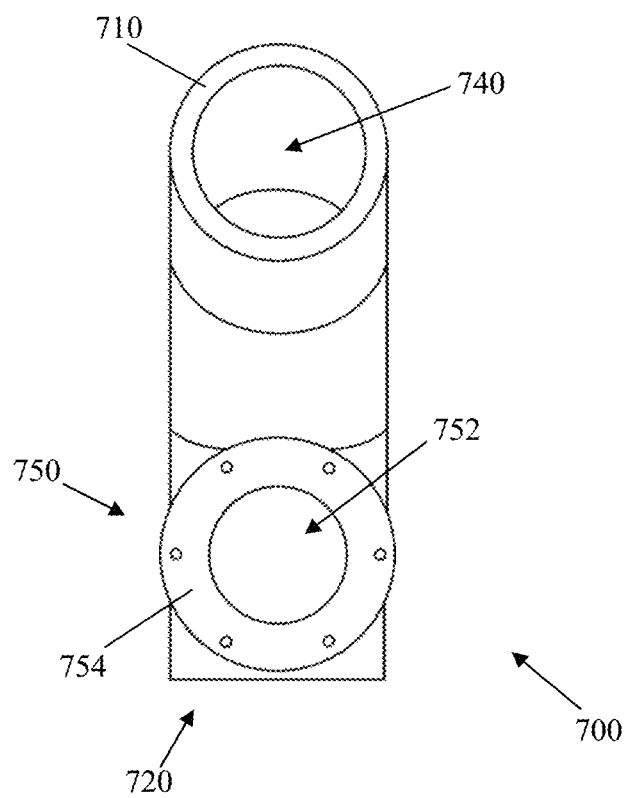
FIG. 13 illustrates a side section view of the overflow outlet pipe of FIG. 12.
Figure 14:
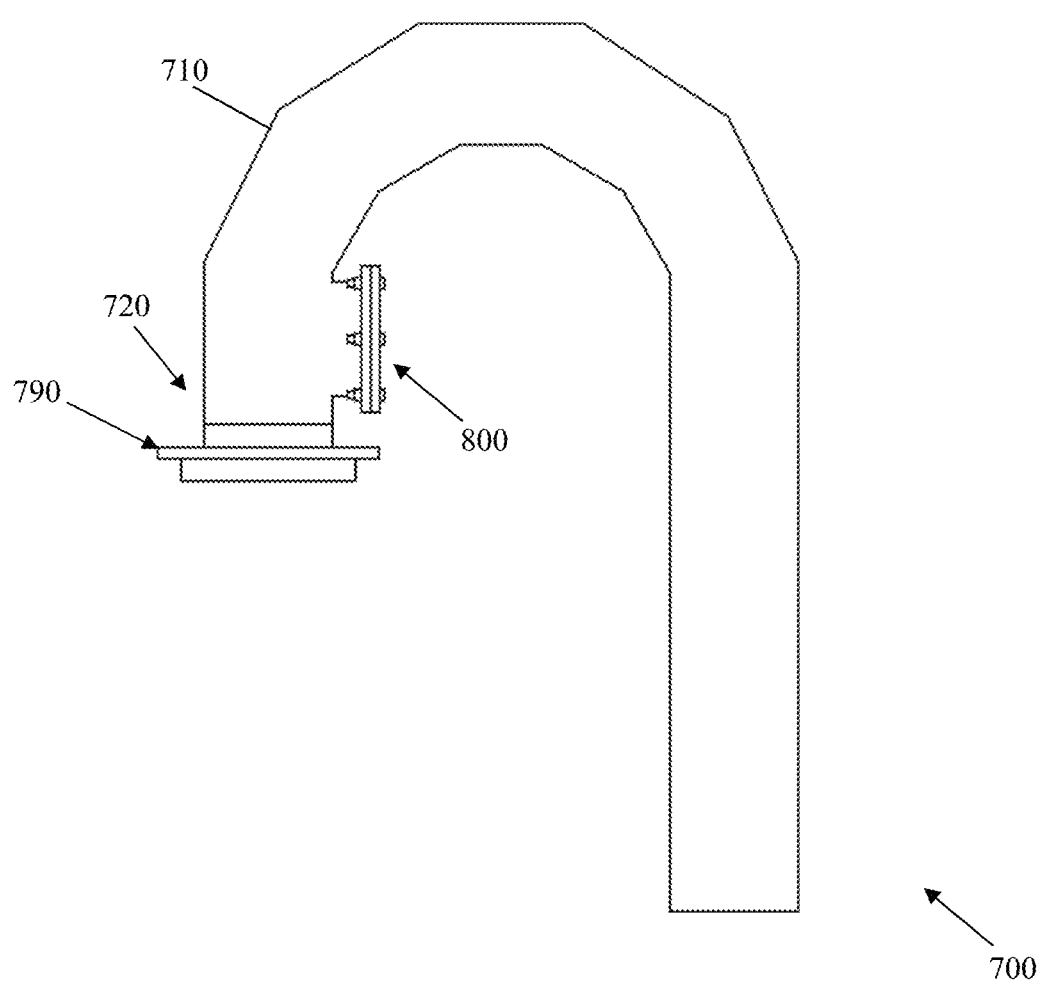
FIG. 14 illustrates a front view of the overflow outlet pipe of FIG. 12 connected to an example overflow outlet of a hydrocyclone and including an example sensor assembly.
Figure 15:
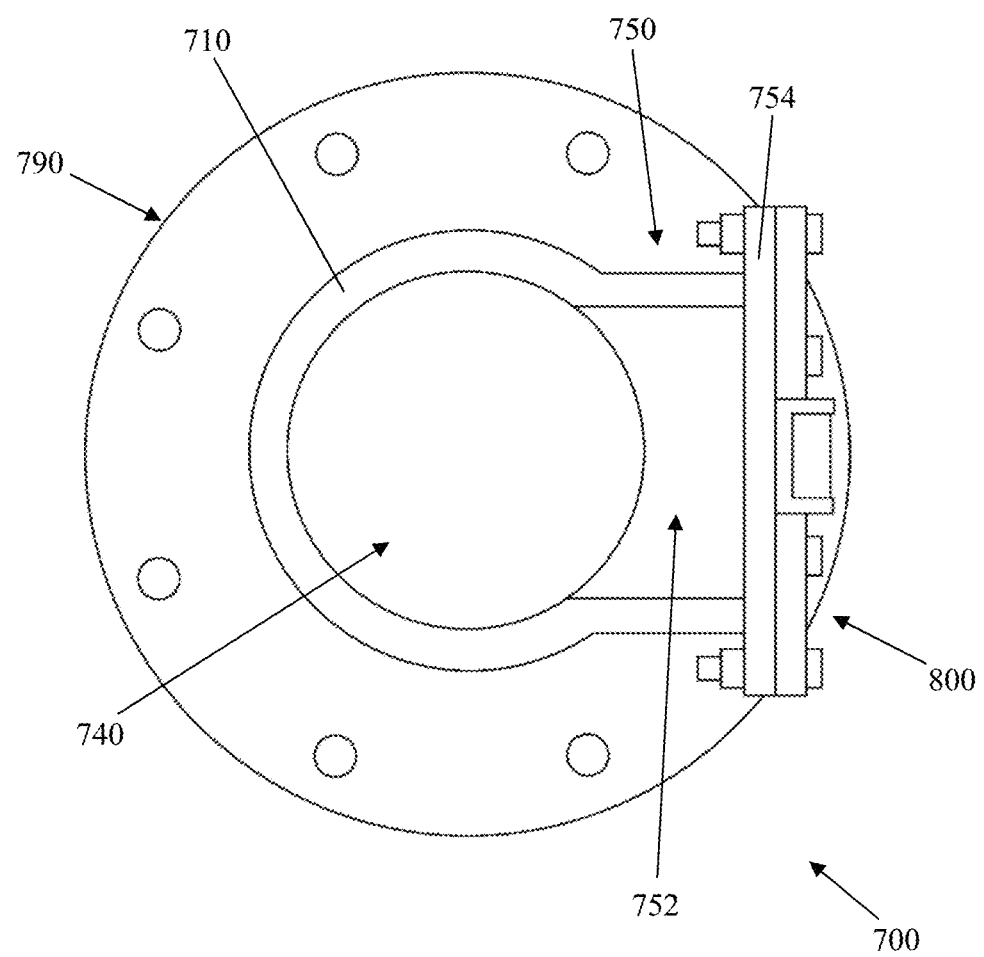
FIG. 15 illustrates a top section view of the overflow outlet pipe of FIG. 14.

Referring to FIGS. 10 and 11, there is illustrated a sensor assembly 600 mounted to a sensor support member 610. Sensor assembly comprises a membrane 620 and a vibrations sensor (not shown) operatively coupled to membrane 610 for detecting vibrations of membrane 620. In some examples, membrane 620 is an elastic membrane. In some examples, membrane 620 is made of rubber. In other examples, membrane 620 may be a sheet of flexible material that is able to move resiliently.

Membrane 620 extends across an area defined by flange 612 of sensor support member 610. Membrane 620 is drawn over flange 612, to provide a taut flexible surface. An edge of membrane 620 is split to form a sheath that lines flange 612. Therefore, membrane 620 attaches to flange 612. Other, or additional, attachment mechanisms may be used to ensure that membrane 620 is tightly and securely drawn over flange 612. Fastener holes 614 are disposed around a collar of sensor support member 610 for allowing passage of fasteners or bolts to fix sensor support member 610 to a sidewall of a conduit.

Membrane 620 comprises a first surface 622 configured to be in communication with a channel of a conduit. Membrane 620 further comprises a second surface 624 opposite to first surface 622 and configured to face away from the channel.

Both first surface 622 and second surface 624 are isolated from the body of a conduit, or from sensor support member 610. Membrane 620 is coupled to sensor support member 610 only by its edge, leaving its two main surfaces 622 and 624 able to vibrate freely. It will be understood that a conduit to which sensor assembly 600 is fixed will vibrate during operation of the hydrocyclone. The vibration of the conduit may be independent and different from vibrations of the flow of overflow material through the conduit. Therefore, it may be preferable to reduce or minimise the amount of vibrations experienced by membrane 620 due to the conduit, or due to other physical components of the hydrocyclone. In some examples, membrane 620 may be principally used to measure vibrations of the flow of overflow material directly by being in contact, through first surface 622, with the overflow material. Being made of a flexible material, membrane 620 may be able to detect and possibly amplify vibrations of the overflow material with which it comes into contact.

A sensor coupling portion 630 allows for coupling of a vibrations sensor to membrane 620. Sensor coupling portion 630 comprises a plate 632, which may be a rigid or reinforcing plate, attached to second surface 624 of membrane 620. Plate 632 may be attached to a flange formed within second surface 624. In other examples, plate 632 may be embedded into membrane 620. Sensor coupling portion 630 further comprises a cylindrical boss 634 attached to the free end of a cantilever extending from plate 632. Boss 634 is sized to frictionally engage a vibrations sensor and the vibrations sensor in mechanical communication thereto. Sensor coupling portion 630 is centrally located on membrane 620. Sensor coupling portion 630 may further be aligned with a central longitudinal axis of the opening in the sidewall of a conduit through which sensor assembly 600 protrudes. Sensor coupling portion 630 is configured to receive and retain at least a portion of the vibrations sensor in mechanical communication with membrane 620 for detecting vibrations of membrane 620 imparted by a flow of overflow material through the conduit.

Sensor assembly 600 further comprises a vibrations sensor (not shown) configured to detect or measure vibrations of membrane 620. The vibrations sensor may be configured to detect or measure characteristics of the flow of the overflow material that are indicative of vibrations, such as displacement, acceleration, force, or any other dynamic characteristic of the flow of the overflow material. In some examples, the vibrations sensor is an accelerometer. The vibrations sensor is attached to second surface 624.

Therefore, in some examples, sensor assembly 600 relates to a sensor system for a hydrocyclone of the type that facilitates separation of a liquid or semi-liquid material mixture into two or more phases of interest. Sensor assembly 600 may be arranged to sense different modes of operation of the hydrocyclone (in relation to the separation process).

In some examples, a membrane assembly for coupling to an overflow pipe of a hydrocyclone comprises membrane 620 and a membrane mount, such as sensor support member 610, configured to mount and maintain membrane 620 parallel to an air core of the hydrocyclone. The membrane assembly further comprises a sensor mount, such as sensor coupling portion 630, for mounting a vibration sensor thereto. The sensor mount may be centrally located on membrane 620.

Referring to FIGS. 12 to 15, there is illustrated an overflow outlet pipe 700. In various embodiments, overflow outlet pipe 700 comprises a channel configured to conduct fluid and/or solids from an overflow outlet 790 of a hydrocyclone and away from the hydrocyclone. Overflow outlet pipe 700 comprises a body 710 having a first open end 720 and a second open end 730. First open end 720 is adapted to couple to overflow outlet 790 of the hydrocyclone, either directly or through an adapter, such as an overflow adapter. Body 710 defines a channel 740 configured to conduct fluid and/or solids from overflow outlet 790. In some examples, overflow outlet pipe 700, and specifically, the portion of body 710 defining channel 740, may comprise a cylindrical pipe having a curve, for instance, a "J" or a "U" shape, as desired. For example, a cylindrical pipe may form a J shape, extending vertically from overflow outlet 790 and first open end 720 and curving approximately 180 degrees, in one embodiment, to direct fluid and/or solid material released from overflow outlet 790 in a downward direction to second open end 730, such as to be deposited in a reservoir or other receptacle. Moreover, overflow outlet pipe 700 may comprise other shapes and configurations as desired, and may provide further aspects, such as to support a sensor assembly.

Specifically, overflow outlet pipe 700 may comprise a sensor assembly stub 750. Sensor assembly stub 750 may comprise a portion of the overflow outlet pipe 700 in fluidic communication with the fluid channel portion 740. In various embodiments, sensor assembly stub 750 is in fluid communication with fluid channel portion 740 but does not provide a portion of a flow path of fluid and/or solid material from overflow outlet 790. In some examples, sensor assembly stub 750 comprises a dead end section of similar fluidically conducting pipe. In some examples, sensor assembly stub 750 comprises a cylindrical pipe segment extending at least partially perpendicularly to a portion of fluid channel portion 740. In some examples, sensor assembly stub 750 is a recess in a sidewall of body 710. Thus, the combination of fluid channel portion 740 and sensor assembly stub 750 may comprise a tee-shape. In this manner, sensor assembly stub 750 may be termed a "stub" of overflow outlet pipe 700.

In some examples, sensor assembly stub 750 comprises a stub fluid channel 752. Stub fluid channel 752 may comprise an interior volume of sensor assembly stub 750 in fluidic communication with the overflow outlet pipe 700, and specifically, fluid channel portion 740 of overflow outlet pipe 700. In some examples, stub fluid channel 752 is a second channel, distinct from the first or main channel of fluid channel portion 740. Stub fluid channel is perpendicular, or extends along a perpendicular direction, relative to fluid channel portion 740. The end of stub fluid channel 752 distal to fluid channel portion 740 is closed while the end of stub fluid channel 752 proximate to fluid channel portion 740 is open. Therefore, stub fluid channel 752 is in communication with fluid channel portion 740 such that a portion of the flow of material through fluid channel portion 740 diverts into stub fluid channel 752 before returning to fluid channel portion 740. In some examples, sensor assembly stub 750 receives vibrations conducted by a fluid and/or solid conducted through fluid channel portion 740 of overflow outlet pipe 700.

In some examples, sensor assembly stub 750 may comprise a sensor assembly attachment flange 754. Sensor assembly attachment flange 754 may comprise an annular plate having an inner diameter proximate to an edge of the stub fluid channel 752 and an outer diameter larger than the inner diameter. In this manner sensor attachment flange 754 may, in some examples, comprise a planar annulus extending radially outward of stub fluid channel 752 and about a circumference of stub fluid channel 752. In some examples, sensor attachment flange 754 comprises an outer diameter proximate to an edge of stub fluid channel 752 and an inner diameter, in some examples, smaller than the outer diameter. In this manner, sensor attachment flange 754 may comprise a planar annulus extending radially inward of the stub fluid channel 752 and inwardly around a circumference of stub fluid channel 752. In some examples, sensor assembly attachment flange 754 may be configured to selectively receive a sensor assembly 800 in mechanical communication to the sensor assembly attachment flange 754, whereby the sensor assembly is retained in fluidic communication with the stub fluid channel 752.

Figure 16:
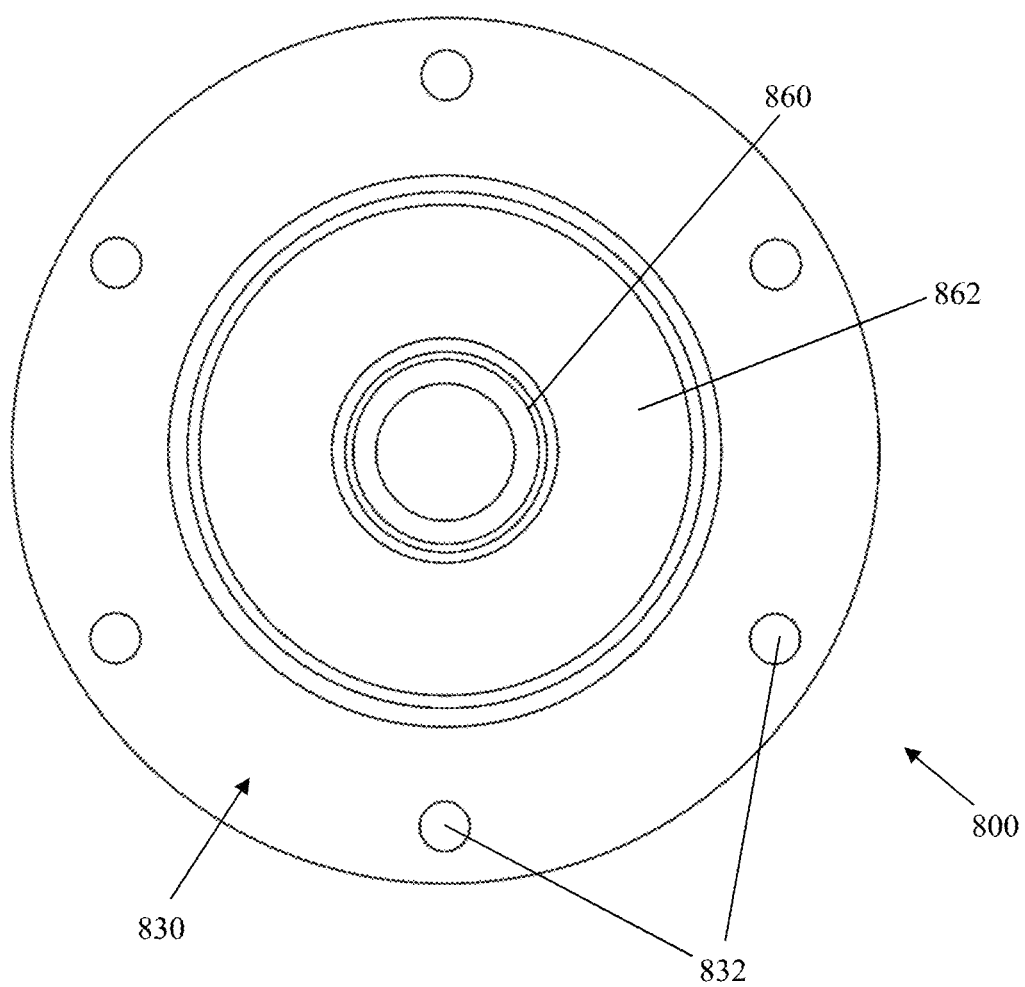
FIG. 16 illustrates a side view of another example sensor assembly.
Figure 17:
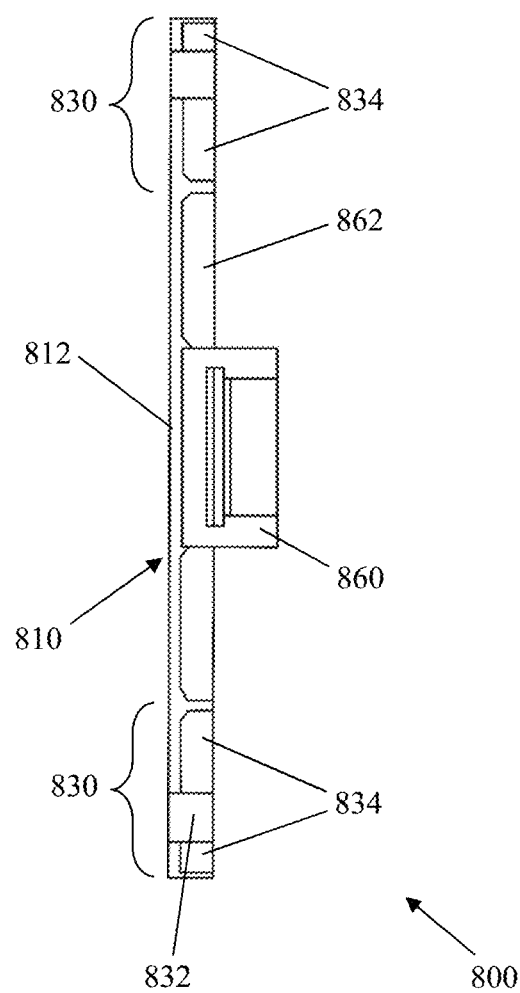
FIG. 17 illustrates a section view of the sensor assembly of FIG. 16.
Figure 18:
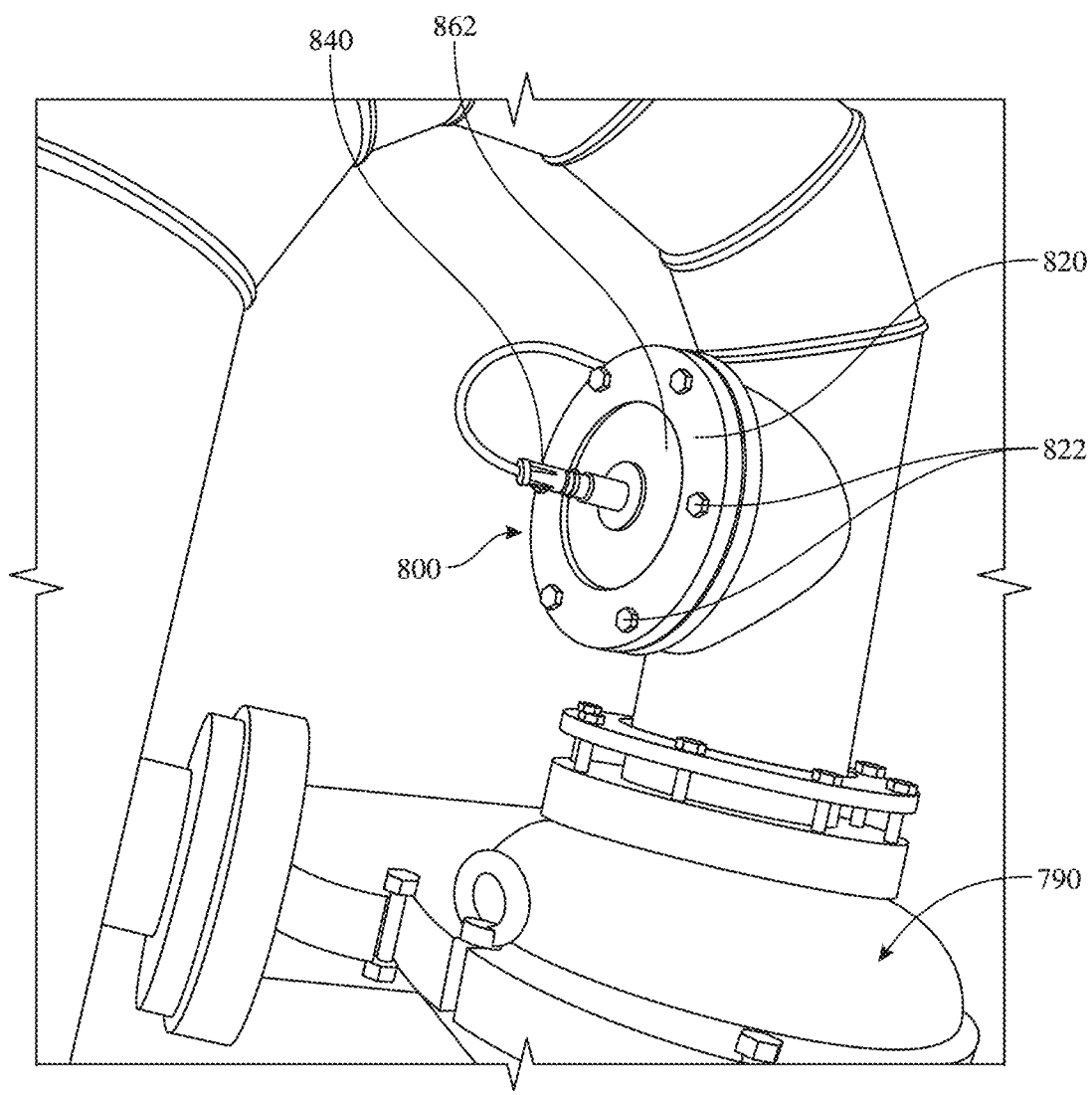
FIG. 18 illustrates a perspective view of an example sensor assembly mounted to an example overflow outlet pipe.

Further referring to FIGS. 16 to 18, sensor assembly 800 may include a membrane 810. In some examples, membrane 810 may comprise a flexible material configurable to be in fluidic communication with stub fluid channel 752. For example, membrane 810 may be attached to the sensor assembly attachment flange 754 to provide a distal end of stub fluid channel 752. Membrane 810 may extend about or across the distal end of stub fluid channel 752 to seal, close, or block the distal end, preventing leakage or passage of fluid through the distal end of stub fluid channel 752. In some examples, membrane 810 may be in mechanical communication with sensor assembly attachment flange 754, thereby receiving vibratory energy from a fluid within stub fluid channel 752. In various embodiments, membrane 810 may comprise rubber, though further flexible resilient membranes may be implemented.

Sensor assembly 800 may also include a membrane attachment plate 820. Membrane attachment plate 820 may comprise a mechanism whereby the membrane 810 is selectably mechanically affixed to the sensor assembly attachment flange 754. For example, membrane attachment plate 820 may comprise an annular metal plate configured to press against the membrane 810 proximate to an attachment rim 830 of membrane 810. In some examples, membrane attachment plate 820 has holes to receive fasteners 822 also inserted through fastener holes 832 of attachment rim 830 of membrane 810. In various instances, membrane attachment plate 820 comprises a series of apertures disposed proximate to a circumferential perimeter of membrane 810 of sensor assembly 800 and loadable in compression by fasteners to press membrane 810 and attachment rim 830 of membrane 810 against stub assembly attachment flange 754.

Sensor assembly may also comprise an accelerometer 840. Accelerometer 840 may comprise an electronic, mechanical, electromechanical, MEMS, or other device configured to sense acceleration. For instance, accelerometer 840 may be configured to detect and characterize the velocity, acceleration, period, and other features of vibrations. Accelerometer 840 may be in operative communication with a local processing system and may provide vibration data comprising data representative of the vibration of the membrane 810. In various instance, accelerometer 840 is attached to membrane 810 via an accelerometer attachment 860.

Sensor assembly 800 may comprise an accelerometer attachment 860. Accelerometer attachment 860 may comprise a cantilevered cylindrical boss extending outwardly from a surface of membrane 810. For example, accelerometer attachment 860 may comprise a cantilevered cylindrical boss extending outwardly from a center of membrane 810. Accelerometer attachment 860 may be aligned with a central longitudinal axis of stub fluid channel 752. Accelerometer attachment 860 may be other shapes than cylindrical as desired. Accelerometer attachment 860 may be shaped to receive and retain at least a portion of accelerometer 840 in mechanical communication with membrane 810 and/or accelerometer attachment 860 of membrane 810, whereby vibrations of membrane 810 (or other vibratory sensing mechanism) in response to vibrations of a fluid in stub fluid channel 752 fluidically conductive with fluid channel portion 740 of the overflow outlet pipe 700, may be detected. Thus, in some examples, accelerometer attachment 860 comprises a flange 862 extending outwardly from a surface of membrane 810 of sensor assembly 800 and sized to frictionally engage accelerometer 840 and retain accelerometer 840 in mechanical communication thereto.

Returning focus to membrane 810 with more specific detail, membrane 810 may have several further aspects. For example, membrane 810 may comprise a drum head member 812. Drum head member 812 may comprise a portion of membrane 810 configured to vibrate in response to vibrations of fluids in stub fluid channel 752. Drum head member 812 may comprise a resilient but flexible material, for instance, a rubber or an elastomer membrane.

Membrane 810 may further comprise an attachment rim 830. Attachment rim 830 may comprise portion of membrane 810 radially outward of the drum head member 812. Attachment rim 830 may be configured to resiliently attach membrane 810 to the sensor assembly attachment flange 754 and seal it thereto. For instance, attachment rim 830 may comprise a reinforcing plate 834. Reinforcing plate 834 may be overmolded within the membrane 810. In further instances, reinforcing plate 834 may be adjacent a surface of membrane 810 and configured to press against membrane 810 (or drum head member 812) when fastened to sensor assembly attachment flange 754. For example, attachment rim 830 may comprise an annular metal plate configured to press against membrane 810 when compressed by membrane attachment plate 820. In various embodiments reinforcing plate 834 is overmolded within the attachment rim 830 and compressible by membrane attachment 820. In some examples, attachment rim 830 comprises fastener holes 832. Fastener holes 832 may comprise aperture defined through the membrane 810 and/or the combination of the membrane 810 and the reinforcing plate 834. For instance, membrane attachment plate 820 may also comprise fasteners 822, such as bolts, which extend through the fastener holes 832 of attachment rim 830 of membrane 810, to retain the membrane against sensor assembly attachment flange 754 via corresponding apertures in sensor assembly attachment flange 754.

Figure 19:
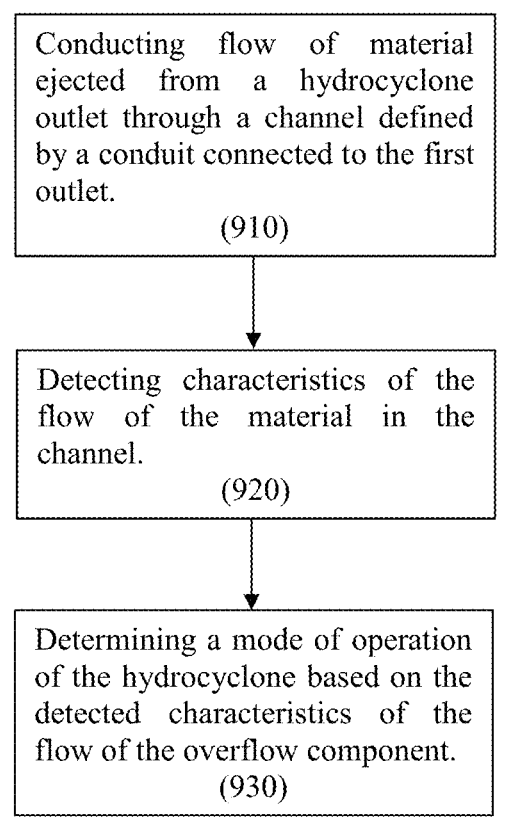
FIG. 19 illustrates a block diagram of an example method of monitoring a hydrocyclone.

Referring to FIG. 19, there is illustrated an example method 900 of monitoring a hydrocyclone. The hydrocyclone comprises a separation chamber having an inlet for feeding an input mixture into the separation chamber and first and second outlets for ejecting flows of respective first and second components of the mixture from the separation chamber. Method 900 comprises step 910 of conducting the flow of the first component ejected from the separation chamber through a channel defined by a conduit connected to the first outlet. Then, at step 920, detecting characteristics of the flow of the first component in the channel. Then, at step 930, determining a mode of operation of the hydrocyclone based on the detected characteristics of the flow of the overflow component.

At step 920, the characteristics of the flow of the overflow component may comprise vibrations of the flow of the first component. Detecting vibrations of the flow of the first component may comprise measuring characteristics of the flow that are indicative of vibrations, such as displacement, acceleration, force, or any other dynamic characteristic of the flow of the first component. The vibrations may be detected or measured using a sensor assembly including a vibrations sensor, such as an accelerometer.

At step 930, determining the mode of operation of the hydrocyclone may comprise analysing frequency and/or amplitude characteristics of the vibrations detected by the sensor assembly.

In other examples, a method of detecting an operating characteristic of a hydrocyclone comprises providing a membrane in communication with a fluid chamber of the hydrocyclone. The fluid chamber may be a separation chamber of the hydrocyclone. The membrane may be provided on an overflow pipe of the hydrocyclone, which is itself in communication with the fluid chamber so as to receive overflow material ejected from the fluid chamber and to conduct the ejected overflow material away from the fluid chamber. The method may further comprise a step of detecting or measuring vibrations of the membrane, or characteristics indicative of vibrations of the membrane, such as acceleration of the membrane. The membrane may be in exposed to or in communication with the fluid chamber of the hydrocyclone, such that material ejected from the fluid chamber may flow past the membrane and impart vibrations onto the membrane. The method may further comprise a step of ascertaining the operating characteristic of the hydrocyclone based on the detected vibrations of the membrane.

Figure 20:
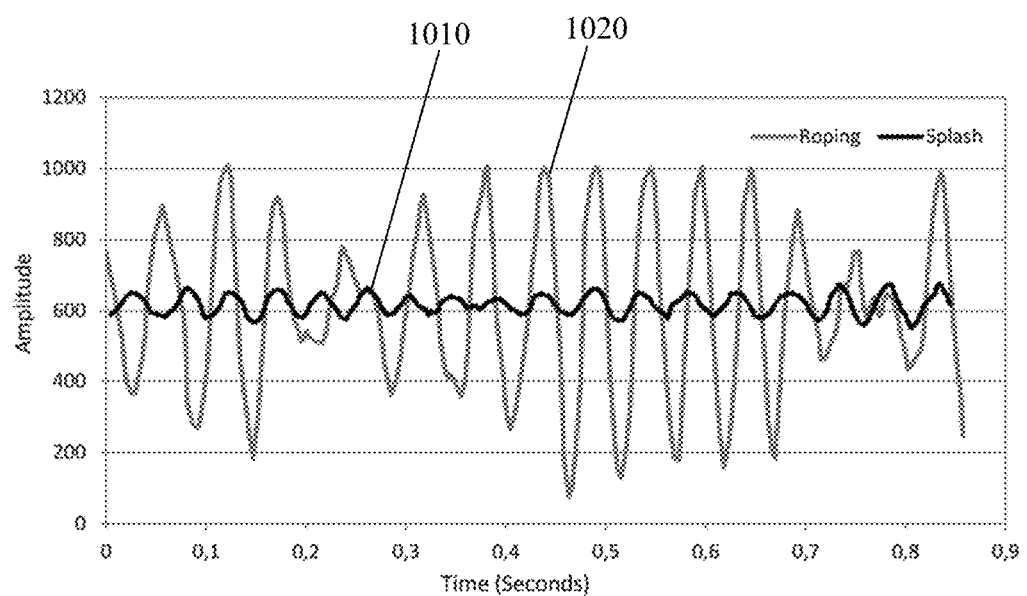
FIG. 20 illustrates an example time-domain plot of measurements of vibrations in the flow of overflow material ejected from a hydrocyclone.

Referring to FIG. 20, there is illustrated a time-domain representation of measurements of vibrations in the flow of overflow material ejected from an example hydrocyclone. Curve 1010 represents amplitudes of the acceleration experienced by the vibrations sensor when the hydrocyclone operates in a splashing mode or state. Curve 1020 represents amplitudes of the acceleration experienced by the vibrations sensor when the hydrocyclone operates in a roping mode or state. The amplitude values for both curves 1010 and 1020 are not absolute values and have been normalised between 0 and 1023. A roping operation of the hydrocyclone is characterised by a greater amplitude of vibrations (or accelerations, or force exerted on the sensor assembly) in the flow of overflow material ejected from the hydrocyclone, compared to a splashing operation of the hydrocyclone.

Figure 21:
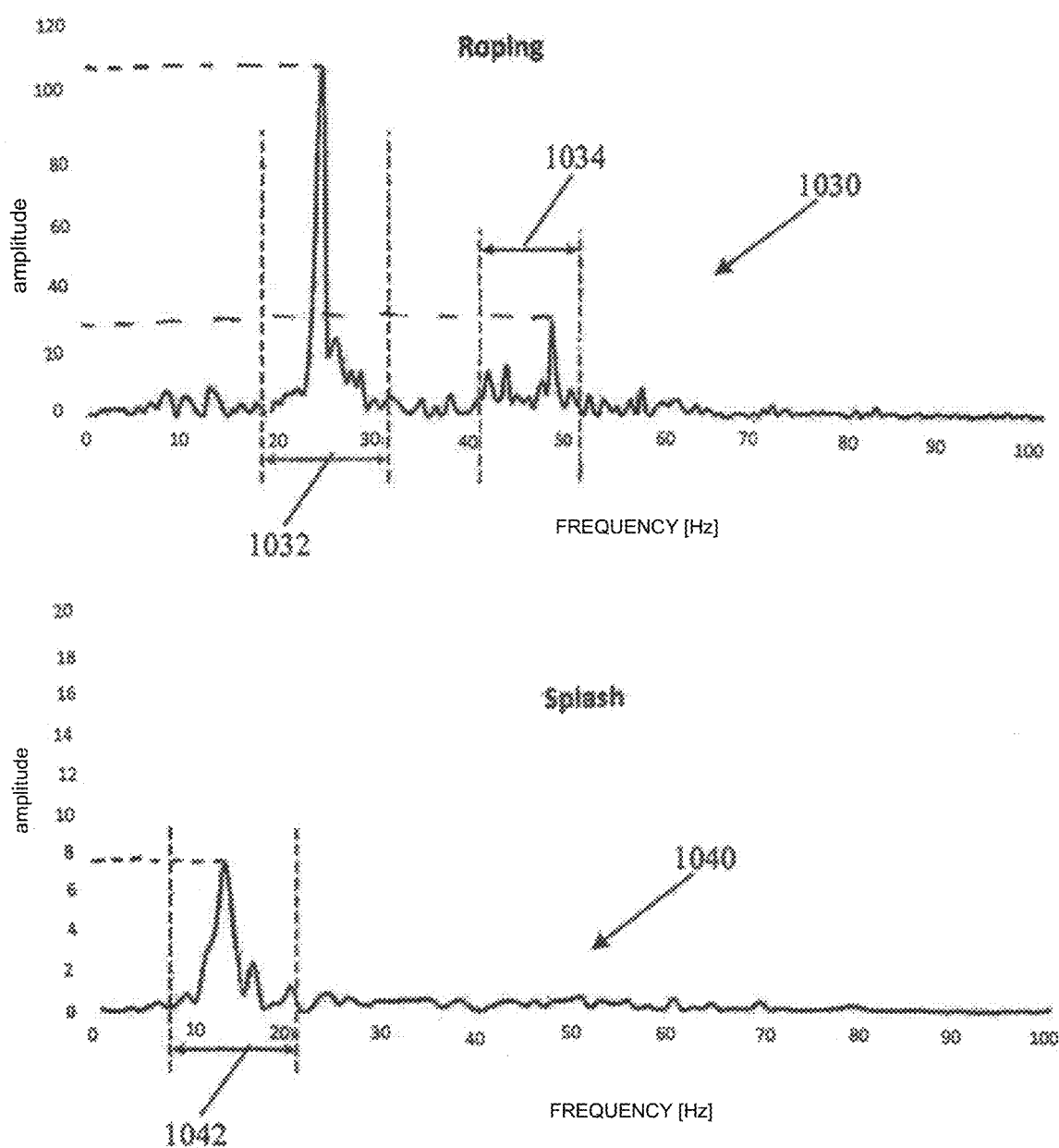
FIG. 21 illustrates an example frequency-domain plot of measurements of vibrations in the flow of overflow material ejected from a hydrocyclone.

Referring to FIG. 21, there is illustrated a frequency-domain representation of measurements of vibrations in the flow of overflow material ejected from an example hydrocyclone. Curve 1030 represents a frequency spectrum of the acceleration experienced by the vibrations sensor when the hydrocyclone operates in a roping mode or state. Curve 1040 represents a frequency spectrum of the acceleration experienced by the vibrations sensor when the hydrocyclone operates in a splashing mode or state. The frequency spectra for both curves 1030 and 1040 are not absolute values and have been normalised. The frequency spectrum may be obtained, for example, by performing a discrete Fourier transform (DFT) over time-sampled measurements of the acceleration experienced by the vibrations sensor. The amplitude values for curves 1030 and 1040 are indicative of the energy of the vibrations.

A roping operation of the hydrocyclone is characterised by different frequencies of vibrations in the flow of overflow material ejected from the hydrocyclone, compared to a splashing operation of the hydrocyclone. In some examples, step 930 comprises detecting the presence of one or more frequency components of the vibrations in one of more frequency bands. For example, the presence of frequency components between about 10 Hz and about 20 Hz may signify a splashing operation of the hydrocyclone, while the presence of frequency components between about 20 Hz and 30 Hz may signify a roping operation of the hydrocyclone.

Curve 1030 shows that, when a hydrocyclone operates in a roping mode, the flow of overflow material ejected from the hydrocyclone may exhibit vibration frequencies in a first signal bandwidth 1032 between about 20 Hz and about 30 Hz, and a second signal bandwidth 1034 between about 40 Hz and about 50 Hz. Signal bandwidth 1034 may be termed a first harmonic bandwidth. The frequency components in the two bandwidths have different amplitude peaks, with a peak amplitude in bandwidth 1032 being greater than a peak amplitude in bandwidth 1034. Curve 1040 shows that, when a hydrocyclone operates in a splashing mode, the flow of overflow material ejected from the hydrocyclone may exhibit vibration frequencies in a signal bandwidth 1042 between about 10 Hz and about 20 Hz. The frequency components in bandwidth 1042 have a lower peak amplitude than the frequency components when the hydrocyclone operates in a roping mode.

Furthermore, an increase in the number of frequency components (i.e. a widening of the spectrum) of the vibrations may indicate a shift from splashing to roping operation. Therefore, in some examples, step 730 comprises analysing the spectral width, or bandwidth, of the vibrations.

By performing signal processing by a local processing system (such as processing system 154 illustrated in FIG. 1), for example, time domain analysis and/or frequency domain analysis, such as by periodically sampling a signal and performing a Fourier transform on the signal, the local processing system may be able to determine an operating mode of the hydrocyclone.

The vibration amplitudes and/or frequencies that indicate the mode of operation of a particular hydrocyclone may depend on physical characteristics of the hydrocyclone, such as its size. In some examples, a process of calibrating the hydrocyclone monitoring system comprises controlling a hydrocyclone to change its mode of operation from a splashing mode to a roping mode. The process may comprise a step of measuring amplitude values of the vibrations of the flow of overflow material as the hydrocyclone shifts from a splashing to a roping mode of operation. A minimum amplitude value may correspond to the amplitude of vibration characteristics as the hydrocyclone enters a semi-roping mode from a splashing mode. A maximum amplitude value may correspond to the amplitude of vibration characteristics as the hydrocyclone exits the semi-roping mode to a roping mode. These minimum and maximum amplitude values would be stored and subsequently used to determine the mode of the operation of the particular hydrocyclone. A similar process may be repeated for defining frequency ranges of vibration characteristics that indicate a shift in the mode of operation of the hydrocyclone.

Figure 22:
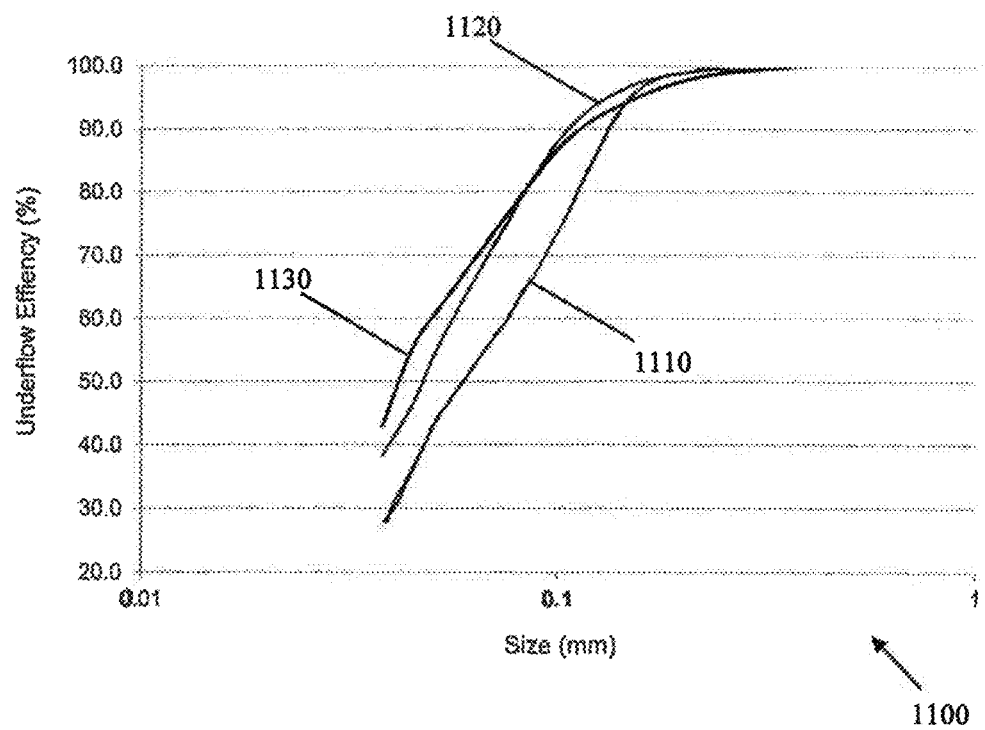
FIG. 22 illustrates example plots of underflow efficiency as a function of underflow particle size for different modes of operation of a hydrocyclone.

Referring to FIG. 22, there is illustrated a plot 1100 of the underflow efficiency as a function of particle size of the underflow material for an example hydrocyclone operating in a roping mode 1110, a semi-roping mode 1120, and a splashing mode 1130. The underflow efficiency is a metallurgical parameter. Its definition for a specific particle size is the percentage of particles in the underflow material having a particle size less than the specific particle size. For example, an underflow efficiency of 80% for a particle size of 0.8 mm means that 80% of particles in a sample of underflow material have a particle size less than 0.8 mm. As can be seen from plot 1100, for smaller particle sizes (i.e. particle sizes less than about 0.1 mm), the underflow efficiency of a hydrocyclone will be highest when the hydrocyclone operates in a splashing mode. However, for particle sizes between about 0.1 mm and 0.3 mm, the underflow efficiency will be highest when the hydrocyclone operates in a semi-roping mode (i.e. the mode of operation between splashing and roping). Therefore, in some examples, it may be preferable to operate a hydrocyclone in a semi-roping mode, or on the verge of a splashing mode prior to entering a roping mode.

Figure 23:
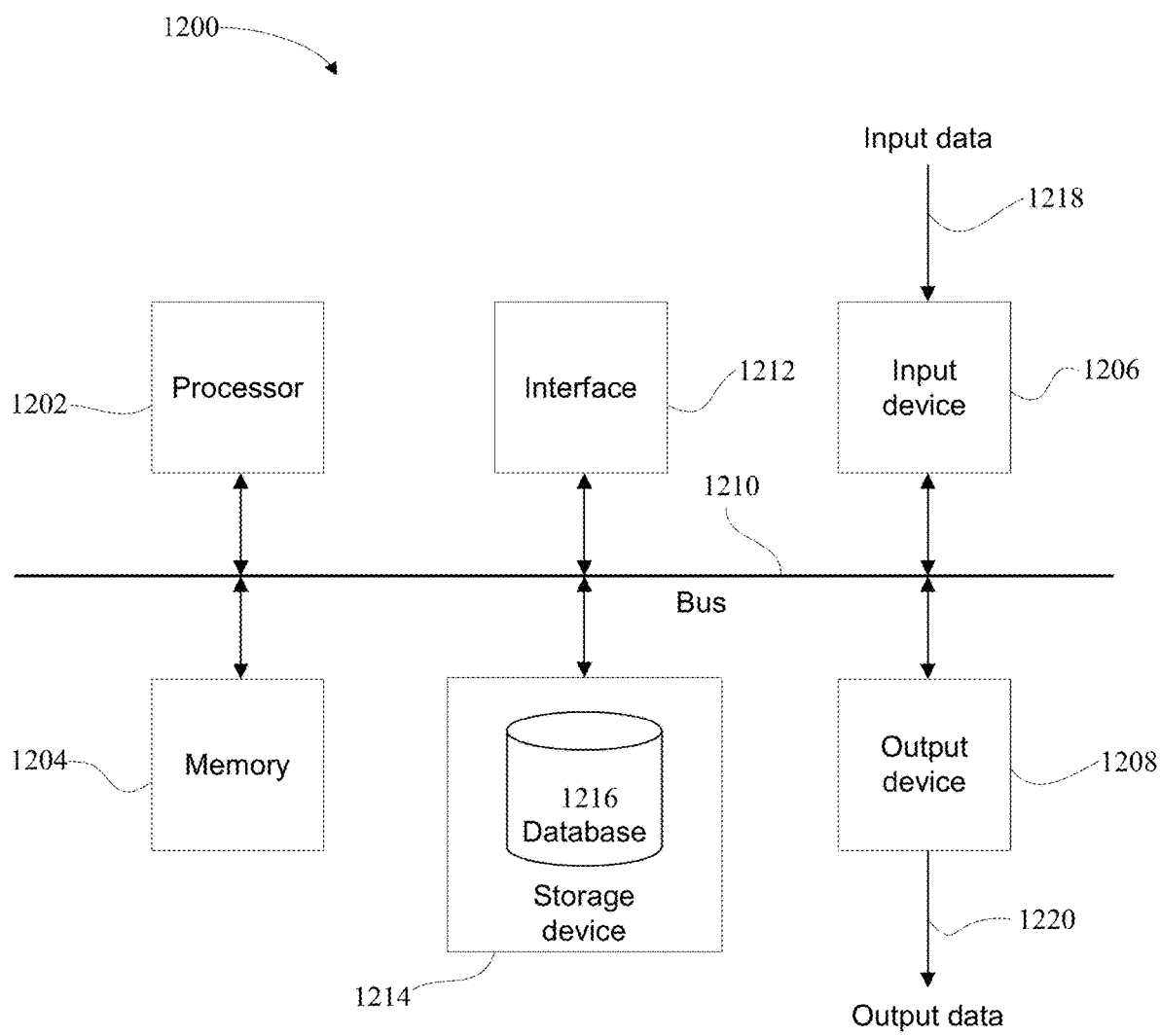
FIG. 23 illustrates a block schematic of an example processing system of a hydrocyclone monitoring system.

Referring to FIG. 23, there is illustrated an example processing system 1200. Processing system 1200 may form part of a hydrocyclone monitoring system (for example, as part of local measurement unit 150 or controller 162 in FIG. 1). Processing system 1200 may further be configured to execute at least some steps of method 700.

In particular, the processing system 1200 generally includes at least one processor 1202, or processing unit or plurality of processors, memory 1204, at least one input device 1206 and at least one output device 1208, coupled together via a bus or group of buses 1210. In certain embodiments, input device 1206 and output device 1208 could be the same device. An interface 1212 can also be provided for coupling the processing system 1200 to one or more peripheral devices, for example interface 1212 could be a PCI card or PC card. At least one storage device 1214 which houses at least one database 1216 can also be provided. The memory 1204 can be any form of memory device, for example, volatile or non-volatile memory, solid state storage devices, magnetic devices, etc. The processor 1202 could include more than one distinct processing device, for example to handle different functions within the processing system 1200.

Input device 1206 receives input data 1218 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 1218 could come from different sources, for example keyboard instructions in conjunction with data received via a network. Output device 1208 produces or generates output data 1220 and can include, for example, a display device or monitor in which case output data 1220 is visual, a printer in which case output data 1220 is printed, a port for example a USB port, a peripheral component adaptor, a data transmitter or antenna such as a modem or wireless network adaptor, etc. Output data 1220 could be distinct and derived from different output devices, for example a visual display on a monitor in conjunction with data transmitted to a network. A user could view data output, or an interpretation of the data output, on, for example, a monitor or using a printer. The storage device 1214 can be any form of data or information storage means, for example, volatile or non-volatile memory, solid state storage devices, magnetic devices, etc.

In use, the processing system 1200 is adapted to allow data or information to be stored in and/or retrieved from, via wired or wireless communication means, the at least one database 1216. The interface 1212 may allow wired and/or wireless communication between the processing unit 1202 and peripheral components that may serve a specialised purpose. In some examples, the peripheral components include a spectrum analyser or any other frequency measurement device. The processor 1202 receives instructions as input data 1218 via input device 1206 and can display processed results or other output to a user by utilising output device 1208. More than one input device 1206 and/or output device 1208 can be provided. It should be appreciated that the processing system 1200 may be any form of terminal, server, specialised hardware, microcontroller, microprocessor, or the like.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A hydrocyclone monitoring system comprising:
a hydrocyclone comprising a separation chamber having an inlet for feeding an input mixture into the separation chamber and first and second outlets for ejecting flows of respective first and second components of the mixture from the separation chamber;
a conduit connected to the first outlet, the conduit defining a channel for conducting the flow of the first component ejected from the separation chamber;
a sensor assembly configured to detect characteristics of the flow of the first component in the channel, the sensor assembly comprising a membrane in communication with the channel, the membrane being positioned to extend about a perimeter of the channel, and a vibrations sensor operatively coupled to the membrane for detecting vibrations of the membrane; and
a processing system configured to receive from the sensor assembly measurement data indicative of the characteristics of the flow of the first component, and to determine a mode of operation of the hydrocyclone based on the measurement data;
wherein the characteristics of the flow of the first component comprise vibrations imparted by the flow of the first component to the sensor assembly.

2. The hydrocyclone monitoring system of claim 1, wherein the first outlet is an overflow outlet of the hydrocyclone.

3. The hydrocyclone monitoring system of claim 1, wherein the second outlet is an underflow outlet of the hydrocyclone.

4. The hydrocyclone monitoring system of claim 1, wherein the processing system is configured to determine the mode of operation of the hydrocyclone by analysing frequency characteristics of the vibrations.

5. The hydrocyclone monitoring system of claim 4, wherein the processing system is configured to detect the presence of one or more frequency components of the vibration in one or more frequency bands.

6. The hydrocyclone monitoring system of claim 1, wherein the processing system is configured to determine the mode of operation of the hydrocyclone by analysing amplitude characteristics of the vibrations.

7. The hydrocyclone monitoring system of claim 1, wherein the membrane is extended about a recess in a sidewall of the conduit.

8. The hydrocyclone monitoring system of claim 7, wherein the membrane is contiguous with a perimeter of the recess such that the combination of the conduit and the membrane define the channel.

9. The hydrocyclone monitoring system of claim 7, wherein the recess defines a second channel having a closed end, the second channel being in communication with the channel such that a portion of the flow of the first component diverts into the second channel and returns to the channel.

10. The hydrocyclone monitoring system of claim 9, wherein the membrane extends about the closed end.

11. The hydrocyclone monitoring system of claim 9, wherein the second channel is perpendicular to the channel defined by the conduit.

12. The hydrocyclone monitoring system of claim 1, wherein the membrane is an elastic membrane.

13. The hydrocyclone monitoring system of claim 1, wherein the vibrations sensor is an accelerometer.

14. The hydrocyclone monitoring system of claim 1, wherein the membrane comprises a first surface in communication with the channel, and a second surface opposite the first surface and facing away from the channel.

15. The hydrocyclone monitoring system of claim 14, wherein the vibrations sensor is attached to the second surface.

16. The hydrocyclone monitoring system of claim 1, further comprising an actuator for controlling a flow of the input mixture through the inlet, wherein the processing system is further configured to operate the actuator based on the determined mode of operation of the hydrocyclone.

17. A method of monitoring a hydrocyclone comprising a separation chamber having an inlet for feeding an input mixture into the separation chamber and first and second outlets for ejecting flows of respective first and second components of the mixture from the separation chamber, the method comprising:
conducting the flow of the first component ejected from the separation chamber through a channel defined by a conduit connected to the first outlet;
detecting, using a sensor assembly, characteristics of the flow of the first component in the channel, the sensor assembly comprising a membrane in communication with the channel, the membrane being positioned to extend about a perimeter of the channel, and a vibrations sensor operatively coupled to the membrane for detecting vibrations of the membrane; and
determining a mode of operation of the hydrocyclone based on the detected characteristics of the flow of the first component;
wherein the characteristics of the flow of the first component comprise vibrations imparted by the flow of the first component to the sensor assembly.

18. The method of claim 17, wherein the mode of operation of the hydrocyclone comprises characteristics of the flow of the second component.

19. The method of claim 18, wherein the characteristics of the flow of the second component comprise a shape of the flow of the second component as it exits the second outlet.

20. The method of claim 19, wherein the shape is one of a roping, semi-roping, and splashing shape.

21. The method of claim 17, wherein determining the mode of operation of the hydrocyclone comprises analysing frequency characteristics of the vibrations.

22. The method of claim 21, wherein analysing frequency characteristics of the vibrations comprises detecting the presence of one or more frequency components of the vibration in one or more frequency bands.

23. The method of claim 17, wherein determining the mode of operation of the hydrocyclone comprises analysing amplitude characteristics of the vibrations.

24. The method of claim 17, further comprising operating an actuator for controlling a flow of the input mixture through the inlet based on the determined mode of operation of the hydrocyclone.

25. A membrane assembly for coupling to an overflow pipe of a hydrocyclone, the membrane assembly comprising:
- a membrane structured for attachment to a sensor assembly stub of an overflow outlet pipe of the hydrocyclone;
- a membrane mount configured to mount and maintain the membrane about a perimeter of the overflow pipe of the hydrocyclone and parallel to an air core of the hydrocyclone;
- a sensor mount for mounting a vibration sensor thereto, the sensor mount being centrally located on the membrane, and
- wherein the membrane further comprises a drum head member configured to move in response to vibrations of a fluid in the overflow outlet pipe of a hydrocyclone; and an attachment rim configured to be selectively mechanically connectable to the overflow outlet pipe, the membrane assembly further comprising an accelerometer attachment configured to retain an accelerometer in mechanical communication with the membrane whereby the vibrations are detectable, and a membrane attachment comprising a flange configured to retain the membrane against the overflow outlet pipe proximate to the attachment rim.

* * * * *